(12) United States Patent
Sagane et al.

(10) Patent No.: US 6,745,888 B2
(45) Date of Patent: Jun. 8, 2004

(54) CONVEYANCE APPARATUS

(75) Inventors: Chitoshi Sagane, Kumamoto (JP);
Hidenobu Nishida, Kumamoto (JP);
Yuji Masaki, Kumamoto (JP); Makoto Sakai, Kumamoto (JP); Shunichi Furusawa, Kumamoto (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/422,914

(22) Filed: Apr. 25, 2003

(65) Prior Publication Data

US 2003/0201148 A1 Oct. 30, 2003

Related U.S. Application Data

(62) Division of application No. 09/752,720, filed on Jan. 3, 2001, now Pat. No. 6,659,262.

(30) Foreign Application Priority Data

| Jan. 17, 2000 | (JP) | 2000-007553 |
| Jan. 19, 2000 | (JP) | 2000-010718 |
| May 26, 2000 | (JP) | 2000-156809 |
| May 26, 2000 | (JP) | 2000-156810 |

(51) Int. Cl.[7] ............................................. B65G 37/00
(52) U.S. Cl. ...................... 198/346.3; 118/423; 118/426
(58) Field of Search ........................... 198/346.3, 378, 198/465.4, 345.2; 118/426, 423, 409, 425; 134/83

(56) References Cited

U.S. PATENT DOCUMENTS

| 3,658,197 | A | | 4/1972 | Didonato |
| 4,772,374 | A | | 9/1988 | Urquhart et al. |
| 5,054,600 | A | * | 10/1991 | Blankemeyer et al. ... 198/345.2 |
| 5,086,794 | A | * | 2/1992 | Guerinat et al. .......... 134/56 R |
| 5,651,822 | A | | 7/1997 | Heckmann |
| 6,223,890 | B1 | * | 5/2001 | Blankemeyer et al. ... 198/861.5 |
| 6,372,107 | B1 | * | 4/2002 | Besinger et al. ............ 204/479 |

FOREIGN PATENT DOCUMENTS

| JP | 59-143819 | 8/1984 |
| JP | 6104920 | 5/1989 |
| JP | 2111481 | 4/1990 |
| SU | 1569300 | 6/1990 |

* cited by examiner

*Primary Examiner*—James R. Bidwell
(74) *Attorney, Agent, or Firm*—Birch, Stewart, Kolasch & Birch, LLP

(57) ABSTRACT

A carrier 3 that is moveably supported on the side of a conveyor 2 is provided with a rotational shaft 4 projecting laterally therefrom. A workpiece 1 is mounted on the rotational shaft 4 in an upright condition, wherein the workpiece 1 is arranged to vertically rotate 360° in the same plane by rotating the rotational shaft 4 360° around its axis. With this construction, the workpiece position can be continuously changed to a floor conveyor position, an overhead conveyor position and to the floor conveyor position without transfer of the workpiece 1.

13 Claims, 27 Drawing Sheets

Fig19
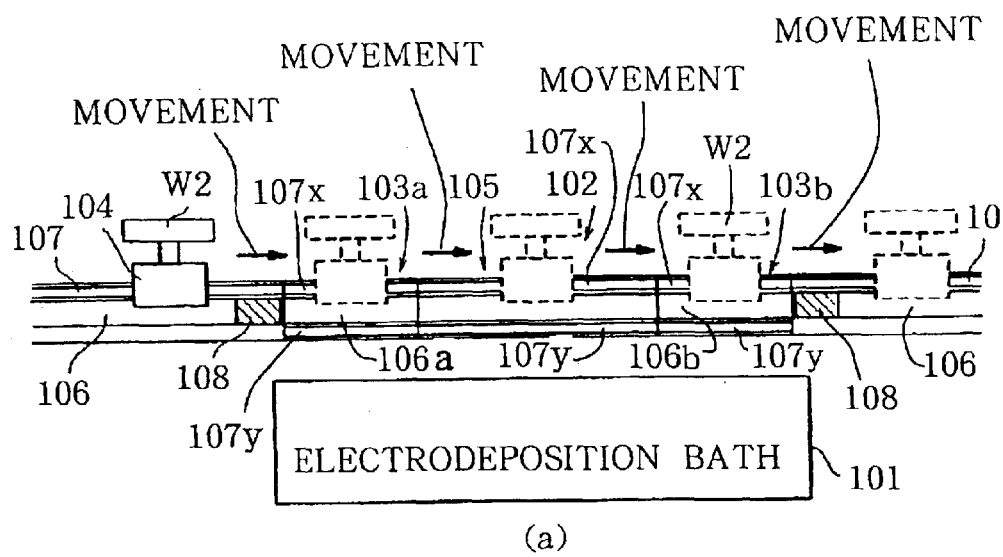
(a)
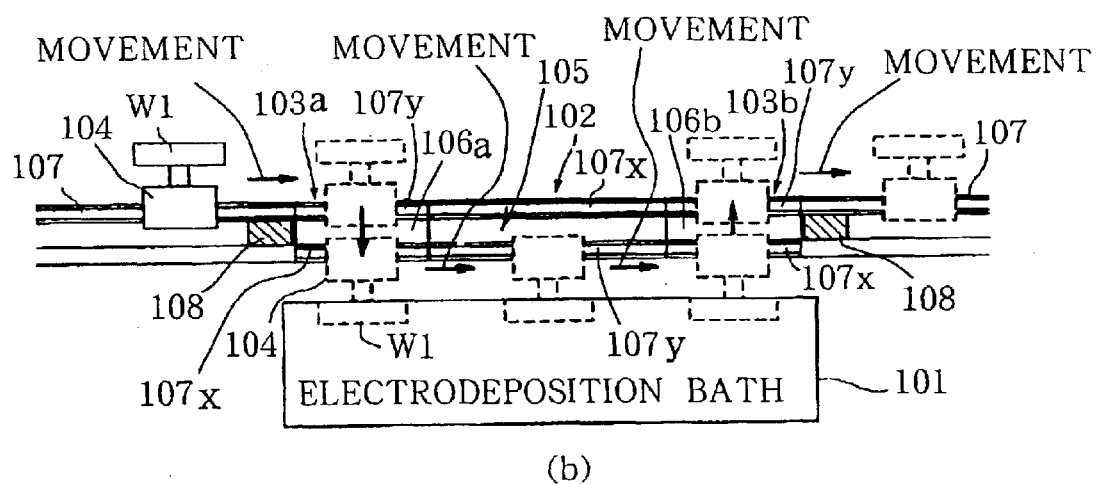
(b)

Fig.22
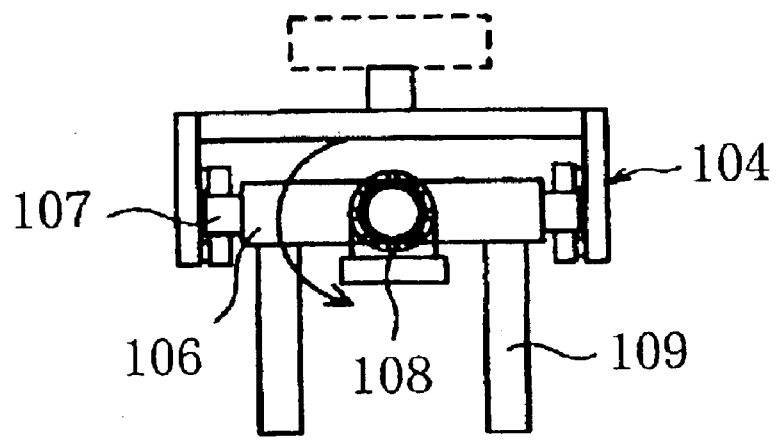
(a)
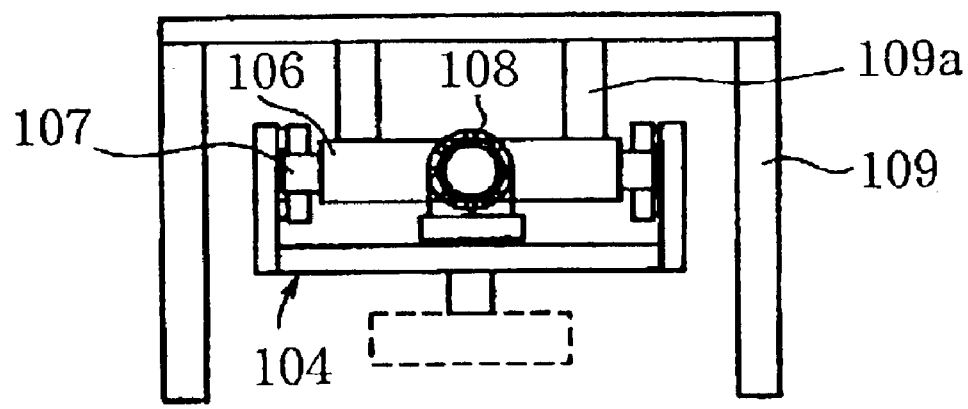
(b)

CONVEYANCE APPARATUS

This application is a divisional of application Ser. No. 09/752,720 filed on Jan. 3, 2001 now U.S. Pat. No. 6,659, 262 the entire contents of which are hereby incorporated by reference and for which priority is claimed under 35 U.S.C. §120; and this application claims priority of Application Nos. 2000-007553 filed in JAPAN on Jan. 17, 2000, 2000-010718 filed in JAPAN on Jan. 19, 2000, 2000-156809 filed in JAPAN on May 26, 2000 and 2000-156810 filed in JAPAN on May 26, 2000 under 35 U.S.C. §119.

BACKGROUND OF THE INVENTION

1. Field of the Invention

The present invention relates to a conveyance apparatus which allows a workpiece supported by a conveyor to pass through a plurality of treating processes while changing its position, and more particularly to a conveyance apparatus which is suitable for a surface treatment line such as a car body painting line in vehicle manufacture. Further, the present invention relates to a conveyance path connecting a pretreatment process and a drying process, used, for example, for painting parts of a vehicle.

2. Description of the Prior Art

In a painting line for a vehicle, there are many treating processes such as pretreatment, electrodeposition, washing, painting, and drying and a workpiece is transferred among these treating processes by a conveyor. When painting of a comparatively large body of, for example, a four-wheel car is required by dipping, as shown in FIG. 17A, a workpiece W which has been transferred on a floor conveyor FC located on a floor is transferred to an overhead conveyor HC for hanging support. The overhead conveyor HC is enabled to move up and down in a vertical manner relative to the pretreatment and electrodeposition line. In such a condition, the workpiece W is moved vertically for dipping treatment while passing above pretreatment and electrodeposition baths and the like and then transferred again to the floor conveyor FC.

Also, in the case of electrodeposition, to obtain fine painting quality, it is known that the workpiece is rotated in an electrodeposition paint bath to change its position to a successive variety of positions (e.g. see Japanese Patent Publication No. Hei 6-104920 and Japanese Unexamined Patent Publication No. Hei 2-111481).

On the other hand, when painting of a comparatively small body of a two-wheel vehicle is required, as shown in FIG. 17B, it is possible to perform all painting processes using the overhead conveyor HC. Accordingly, it is not necessary to transfer the body in the middle of the painting line as with the four-wheeled vehicle. However, as far as the dipping treatment is concerned, the vertical operation is conducted in the same manner as shown above.

In the following description, a workpiece position of a type in which the workpiece is mounted and supported on a floor conveyor is called a floor conveyor position, a workpiece position of a type in which the workpiece is hung and supported is called an overhead conveyor position, and a workpiece position of a type in which the workpiece is substantially supported in a level plane at the side of the conveyor is called a side conveyor position. Further, rotation in a plane parallel to and perpendicular to the direction of travel is called vertical rotation, while rotation in a plane at right angles to the direction of travel is called horizontal rotation.

Also, for example, in the manufacture of a fuel tank, body frame or the like as parts for a motorcycle, when the tank or the frame which undergoes electrodeposition painting and the tank or frame which does not undergo electrodeposition painting are transferred on a common line, as shown in FIG. 23, a diverging point is provided in a line at the upstream side of an electrodeposition bath and a line A is used for the workpiece being painted, whereas a by-pass line B is used for the workpiece not being painted and these lines join in the junction at the downstream side of the electrodeposition bath.

Further, in the case of, for example, painting parts or the like of a vehicle, as shown in FIG. 27, for example, after a workpiece W conveyed by means of a carrier G along a workpiece conveyance path H has been immersed in an electrodeposition bath (not shown) at a pretreatment process A, the workpiece W after being removed from the electrodeposition bath is transferred to a drying process C to dry a paint film. At this time, in order to prevent hot air from the drying process C from entering the pretreatment process A, a hot air isolating zone B is generally provided between the pretreatment process A and the drying process C. The hot air isolating zone B is shortened to save a space by having an equipment formed in such a construction that, a workpeice conveying path H of the hot air isolating zone B slants, and a workpiece conveying path H of the drying process C is located at a higher position, thereby making it difficult for the hot air from the drying process C to enter the pretreatment process A.

SUMMARY OF THE INVENTION

In a process wherein the workpiece position must be changed to the floor conveyor position and the overhead conveyor position, if the workpiece has to be transferred from one conveyor to another whenever the workpiece position is changed, loss of time is caused. It is therefore desired not to transfer the workpiece while being conveyed at least in one continuous process even though the workpiece position is changed.

Further, in a method such as a dipping treatment wherein a conveyance line is continuously changed vertically, the proportion of time not suitable for dipping but required only for moving the workpiece in and out of a bath becomes large relative to the substantial dipping time of the workpiece. Accordingly, it is also desired to improve this loss of time. Also, in the case of the overhead conveyor, there is some possibility that the painting quality deteriorates when dust or the like falling from the overhead conveyor adheres to the workpiece. It is therefore desired to realize a conveyance method which keeps such falling substances from adhering to the workpiece. It is therefore a first object of the present invention to solve the above-mentioned disadvantages.

Also, if the above-mentioned by-pass line B is installed, there are disadvantages that the equipment construction including the conveyance apparatus is large in size, and the equipment cost is high, and conveying control becomes complicated.

It is therefore a second object of the present invention to solve the above-mentioned disadvantages.

Furthermore, the hot air isolating zone B having the slanting conveying path as mentioned above is still too long, therefore, it is preferable to further shorten the zone B.

It is therefore a third object of the present invention to minimize the distance between a pretreatment process and a drying process and to reduce the equipment space further, in a conveyance apparatus in which difference in height is provided for a workpiece conveyance path for the pretreatment process and a workpiece conveyance path for the drying process.

To solve the above-noted disadvantages, according to the first invention, a conveyance apparatus has a conveyor for supporting a workpiece and is adapted to allow the workpiece to pass through a plurality of treating processes while changing a workpiece position, wherein a position control mechanism for changing the workpiece position is provided so that the workpiece position required for each treating process can be continuously changed without transfer of the workpiece.

According to the present invention, the workpiece is conveyed to a plurality of treating processes which require different workpiece positions while being supported by the same conveyor and the position control mechanism is provided to allow the workpiece to be changed to the most suitable workpiece position for each process. Thus, it is no longer necessary to transfer the workpiece to another type of conveyor for each process and continuous conveyance is possible. It is therefore possible to reduce the number of transfer processes that have been required for the conventional conveyance apparatus and improve the efficiency for conveyance of the workpiece among the plurality of processes.

This position control mechanism can be arranged to either control the workpiece position to provide a floor conveyor position in which the workpiece is supported above the conveyor and an overhead conveyor position in which the workpiece is hung and supported below the conveyor; or to allow the workpiece to be supported substantially in a level plane on the side of the conveyor to realize a side conveyor position; or to continuously control the workpiece position to provide the floor conveyor position, the overhead conveyor position and the side conveyor position. The position control mechanism can also be arranged to realize all of the above positions.

Also, since the floor conveyor position and the overhead conveyor position are controllable, continuous treatment can be carried out without transfer of the workpiece even in such a treating process as the dipping treatment where the floor conveyor position and the overhead position are alternately required. If the system is controlled to provide the side conveyor position, the workpiece can be supported substantially in a level plane laterally from the conveyor. It is therefore effective in such a process, in particular a painting process, to prevent substances falling from the conveyor from adhering to the workpiece. Furthermore, if the floor conveyor position, the overhead conveyor position, and the side conveyor position are controlled in combination, it is possible to easily realize such complicated position control where the workpiece is required to rotate to allow each surface to face a specified direction in sequence.

The position control mechanism also makes it possible for the workpiece position to be changed either to provide vertical rotation within a plane parallel to the direction of travel of the conveyor or to provide horizontal rotation that rocks within a plane perpendicular to the direction of travel, or makes both vertical and horizontal rotation possible simultaneously.

This kind of control between the floor conveyor position and the overhead conveyor position can be realized by rotating the workpiece vertically. It is suitable for a continuous conveyance method that controls the workpiece position while continuously conveying the workpiece. In this case, if the rotational shaft projecting laterally from the conveyor is arranged to support the workpiece and rotated around its axis, the workpiece can be vertically rotated.

Also, control between the floor conveyor position and the overhead conveyor position and if necessary, control among the workpiece positions including the side conveyor position can be realized by rotating the workpiece horizontally. In this case, control can be easily realized by rocking the arm member within a plane where the horizontal rotation is made or by rotating a moveable portion provided on a part of the conveyor together with the workpiece. It is especially suitable for a tact conveyance method that intermittently conveys the workpiece.

Moreover, the conveyance apparatus is characterized in that a part of the conveyor is arranged to serve as a moveable portion and a rotational means is provided to rotate the moveable portion in a plane at right angles to the direction of travel of the conveyor, wherein the rotational means rotates the moveable portion together with the carrier.

According to the present invention, a part of the conveyor is provided with a moveable portion and when the moveable portion is rotated by a rotational means, not only the moveable portion, but also a carrier that is supported by the moveable portion rotates integrally. It is therefore possible to rotate a workpiece horizontally so as to change its position freely to a floor conveyor position, an overhead conveyor position and the like. Thus, it is no longer necessary to transfer the workpiece even when the workpiece position must be changed for every continuous process, therefore loss of time can be reduced. Accordingly, it is particularly suitable for a tact treatment where conveyance is intermittently stopped at every process for a necessary treatment.

In this case, the carrier can move like a monorail on the periphery of the conveyor that passes through the center portion of the carrier. Also, a carrier feeding means for moving the carrier on the conveyor in the direction of travel is provided parallel to the conveyor and the carrier can be provided with a flange portion which always engages the carrier feeding means.

If the carrier is supported like a monorail on the conveyor, the supporting construction of the carrier is simplified and strengthened. Thus, conveyance of the workpiece can be stabilized and it is especially favorable when a heavy workpiece must be supported. In addition, if the carrier is provided with a flange which engages a carrier feeding means provided parallel to the conveyor, the carrier is always maintained in the engaging condition with the carrier feeding means even if the carrier rotates and movement of the carrier is enabled. On the other hand, in a method where the carrier is supported on one side of the conveyor, since the workpiece can be supported laterally away from the conveyor, thereby keeping substances falling from the conveyor from adhering to the workpiece.

Further, it is possible to convey the carrier in the direction of travel while supporting it on one side of the conveyor. The rotational means may be a step motor that can be situated within the conveyor.

Also, since a part of the conveyor is arranged to serve as the moveable portion, it is possible to strengthen the moveable portion and simplify the construction comparatively. The rotational means can be easily formed with a step motor and the like. When the step motor is used, it can be easily housed inside a hollow portion of the conveyor, and the rotational direction and angle are controllable.

In the second invention, a conveyance apparatus is provided for mixed workpieces in which a workpiece conveying path is provided above a treatment bath, and a workpiece to be immersed in the treatment bath and a workpiece not to be immersed in the treatment bath are adapted to be mixedly conveyed by means of a carrier which is capable of running along a travelling rail of said workpiece conveying path, characterized in that a carrier inversion mechanism is provided in at least one portion of said workpiece conveying path above said treatment bath, and said workpiece to be immersed in said treatment bath is inverted in a plane at right angles to said conveying path by said carrier inversion mechanism to allow the workpiece to pass said treatment bath.

When the workpiece is transferred toward the treatment bath, the workpiece which is not be immersed in the treatment bath is allowed to travel in a condition in which the travelling course of the workpiece passes above the treatment bath, whereas the workpiece which is to be immersed in the treatment bath is converted to a position in which the travelling course of the workpiece passes inside the treatment bath.

The carrier inversion mechanism is so designed that the transporting course of the workpiece is changed vertically by inverting the workpiece together with the carrier by 180°. For example, a center of an inversion axis is set to be spaced to a certain extent from the workpiece.

Also, the treatment bath can be applied, for example, to a dipping bath for electrodeposition painting, a dipping bath for paint pretreatment, and other dipping baths.

Further, the carrier inversion mechanism is enabled to be inverted together with the travelling rail of the workpiece conveying path.

Since the carrier inversion mechanism is enabled to be inverted together with the travelling rail of the workpiece conveying path, it is possible to simplify the inversion mechanism for the workpiece which is supported by the carrier.

Furthermore, the carrier inversion mechanism is paired to position an intermediate travelling portion between the upstream side and the downstream side of the workpiece conveying path above the treatment bath.

In this manner, since a pair of carrier inversion mechanism is provided on both the upstream and downstream sides and the intermediate travelling portion is also provided therebetween, it is possible to secure sufficient immersion time for the workpiece and satisfactory immersion treatment can be performed.

Also, the travelling rail is formed as a double, upper and lower rail, structure.

Therefore, because the travelling rail has this double, upper and lower rail, structure, for example, in both cases where the workpiece not immersed in the treatment bath is moved while being supported above the carrier, and where the workpiece immersed in the treatment bath is moved while being supported below the carrier, it is possible to prevent interference between a conveying stand installed on the floor surface and the carrier.

When the intermediate travelling portion is provided and both the immersed workpiece and the non-immersed workpiece are caused to pass this intermediate travelling portion, for example, the conveying stand is positioned between the upper and lower rails. If the workpiece is supported above the carrier, the carrier is caused to move along the upper rail. If the workpiece is supported below the carrier, the carrier is caused to move along the lower rail. Thus, there is no interference between the conveying stand and the carrier.

According to the third invention, a conveyance apparatus is provided in which different heights are provided for a workpiece conveyance path for a pretreatment process and a workpiece conveying path for a drying process, a connecting workpiece conveyance path being provided at an intermediate portion of the two processes, characterized in that on said connecting workpiece conveyance path, a conveyance path lifter mechanism is provided to transfer a workpiece conveyance from the workpiece conveyance path for the pretreatment process toward the workpiece conveyance path for the drying process.

Herein, a conveyance path lifter mechanism is a mechanism capable of switching and connecting a lower workpiece conveyance path and an upper workpiece conveyance path, by at least one portion of a connecting workpiece conveyance path which is permitted to move up and down vertically.

In addition, when the workpiece is transferred by means of a carrier or the like from the workpiece conveyance path for the pretreatment process to the connecting workpiece conveyance path, the workpiece is displaced upward at at least one portion of the connecting workpiece conveyance path together with the carrier by means of the conveyance path lifter mechanism, whereby the carrier or the like is connected to the workpiece conveyance path for the upper drying process, and the workpiece is connected to the drying process.

In this manner, if the workpiece is displaced and transferred vertically by the conveyance path lifter mechanism of the connecting workpiece conveying path for connection, the distance between the pretreatment process and the drying process can be shortened, thus saving space.

Also, in a conveyance apparatus in which different heights are provided between a workpiece conveyance path for a pretreatment process and a workpiece conveyance path for a drying process, a connecting workpiece conveyance path is provided at an intermediate portion of the two processes. On the connecting workpiece conveyance path, a conveyance path reversing mechanism is provided to transfer a workpiece conveyed from said workpiece conveyance path for said pretreatment process toward said workpiece conveyance path for said drying process.

Herein, a conveyance path reversing mechanism is a mechanism which is capable of switching the lower workpiece conveyance path and the upper workpiece conveyance path and connecting them, by reversing at least a part of the connecting workpiece conveying path 180°.

In addition, when the workpiece is transferred by means of a carrier from the workpiece conveyance path for the pretreatment process to the connecting workpiece conveyance path, the workpiece is reversed by 180° at at least one portion of the connecting workpiece conveyance path together with the carrier by means of the conveyance path reversing mechanism, whereby the carrier is connected to the workpiece conveyance path for the upper drying process, and the workpiece is conveyed to the drying process.

In this manner, even though the connecting workpiece conveyance path is reversed 180° by means of the conveying path reversing mechanism of the connecting workpiece conveyance path and the workpiece is transferred, the distance between the pretreatment process and the drying process can be shortened, thus saving space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and of the scope of the invention will become apparent to those skilled in the art from this detailed description.

BRIEF DESCRIPTION OF THE DRAWINGS

The above and other objects, features and advantages of the present invention will become more apparent from the following description when taken in conjunction with the accompanying drawings.

FIGS. 19(a) and 19(b) are side views explaining the structure of the conveyance apparatus, FIG. 19(a) being a view explaining the case where a workpiece is not immersed in an electrodeposition bath, and FIG. 19 a view explaining the case where the workpiece is immersed in the electrodeposition bath;

FIGS. 22(a) and 22(b) are views explaining a relationship of a carrier with a conveying stand in a case of one rail.

DETAILED DESCRIPTION OF THE PREFERRED EMBODIMENTS

The first preferred embodiments for performing body painting of a motorcycle will be described hereunder with reference to the accompanying drawings.

Figure 1:
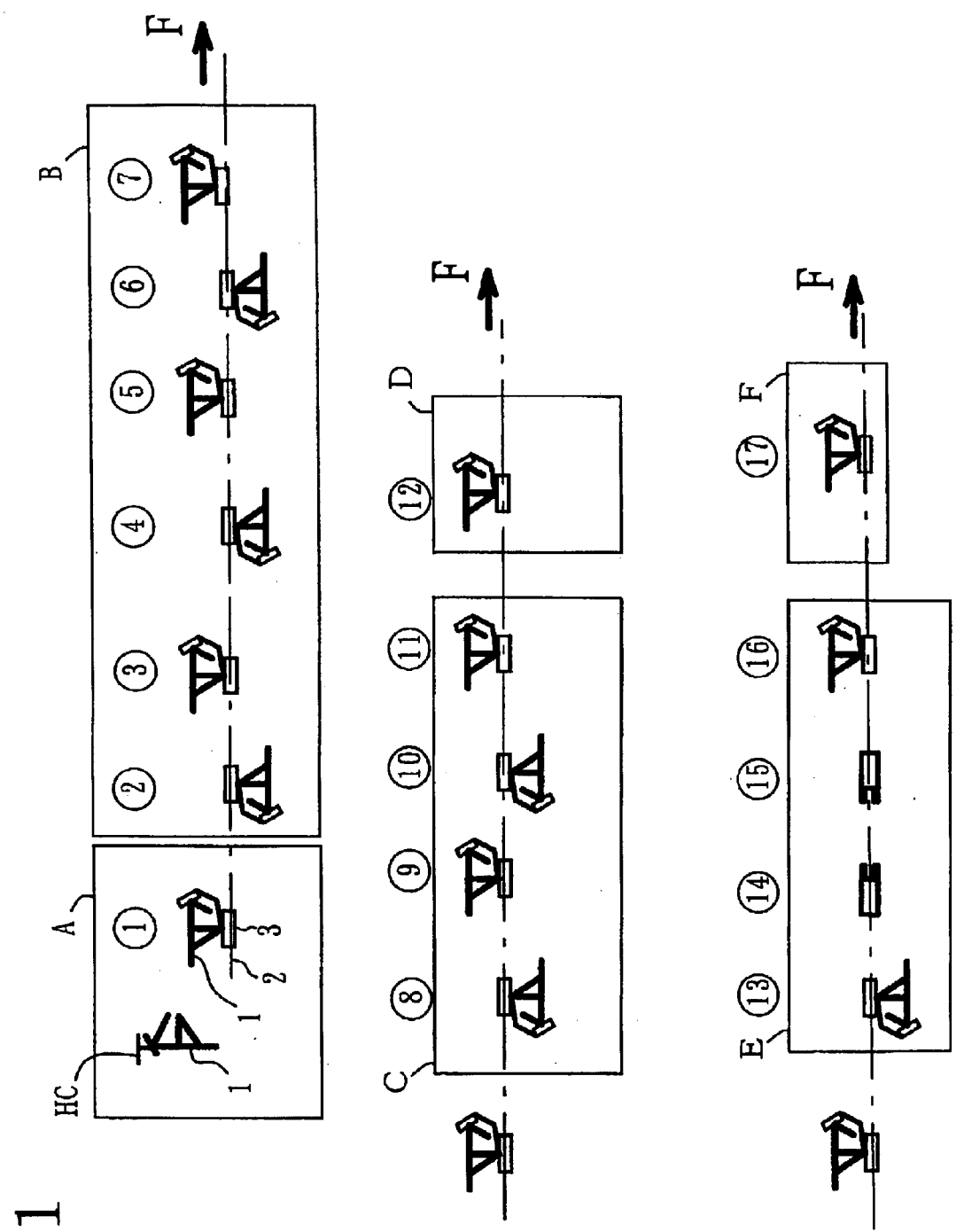
FIG. 1 is a process chart for a complete body painting line according to a first embodiment (FIGS. 1 to 8)

FIG. 1 is a flow chart of a complete painting line in which each action of loading and jig attachment A, pretreatment B, electrodeposition coating C, electro-deposition drying D, finish coating E and finish drying F is continuously conducted in sequence. Circled figures in the flow chart show the processes of FIG. 1. (The process number in the description is shown by the corresponding parenthesized numbers. Identical indication thereafter.)

First, in the process of loading and jig attachment A, a workpiece 1 which is the frame body of a motorcycle has been hung and conveyed by an overhead conveyor HC of a welding line which is a process previous to this painting line. The workpiece 1 is then mounted on a conveyor 2 in a floor conveyor position through a carrier 3 (1).

Now, in the process of pretreatment B, the workpiece position is continuously changed by rotating the workpiece 1 upward to the floor conveyor position and downward to the overhead conveyor position so as to perform each process of degreasing (2) (the overhead conveyor position), washing and surface preparation (3) (the floor conveyor position), chemical conversion treatment (4) (the overhead conveyor position), washing (5) (the floor conveyor position), washing (6) (the overhead conveyor position), and pure water washing and draining (7) (the floor conveyor position).

In the process of electrodeposition coating C, the workpiece position is also changed by rotating the workpiece 1 upward to the floor conveyor position and downward to the overhead conveyor position so as to perform each process of the electrodeposition coating (8) (the overhead conveyor position), washing (9) (the floor conveyor position), washing (10) (the overhead conveyor position) and pure water washing (11) (the floor conveyor position).

In the process of pretreatment drying D, the floor conveyor position is maintained to allow the workpiece 1 to pass through an electrodeposition drying furnace without changing the workpiece position (12).

In the finish coating E, the workpiece 1 is rotated from the floor conveyor position to the overhead conveyor position and conveyed into a finish-coating booth of a spray type (13). The workpiece 1 in the finish-coating booth is then rotated at right angles until it is at the side conveyor position (14), then the workpiece 1 is rotated 180° to reverse it (15). The workpiece 1 is then rotated again 90° in the reverse direction to return it to the floor conveyor position in an upright position (16).

Thus, by controlling the workpiece position with a combination of vertical rotation and horizontal rotation, it is possible to realize horizontal painting in which each surface to be painted is always kept face upward for spray painting and a satisfactory finish coating can be realized. Further, the workpiece 1 is always kept at a remote position laterally from the conveyor 2. It is therefore possible to remarkably reduce the possibility of dust and the like falling from the conveyor 2 to adhere to the workpiece 1, so that the coating quality in the finish coating can be improved.

In the finish drying process F thereafter, the workpiece 1 is maintained in the floor conveyor position to allow it to pass through the finish drying furnace (17).

Figure 2:
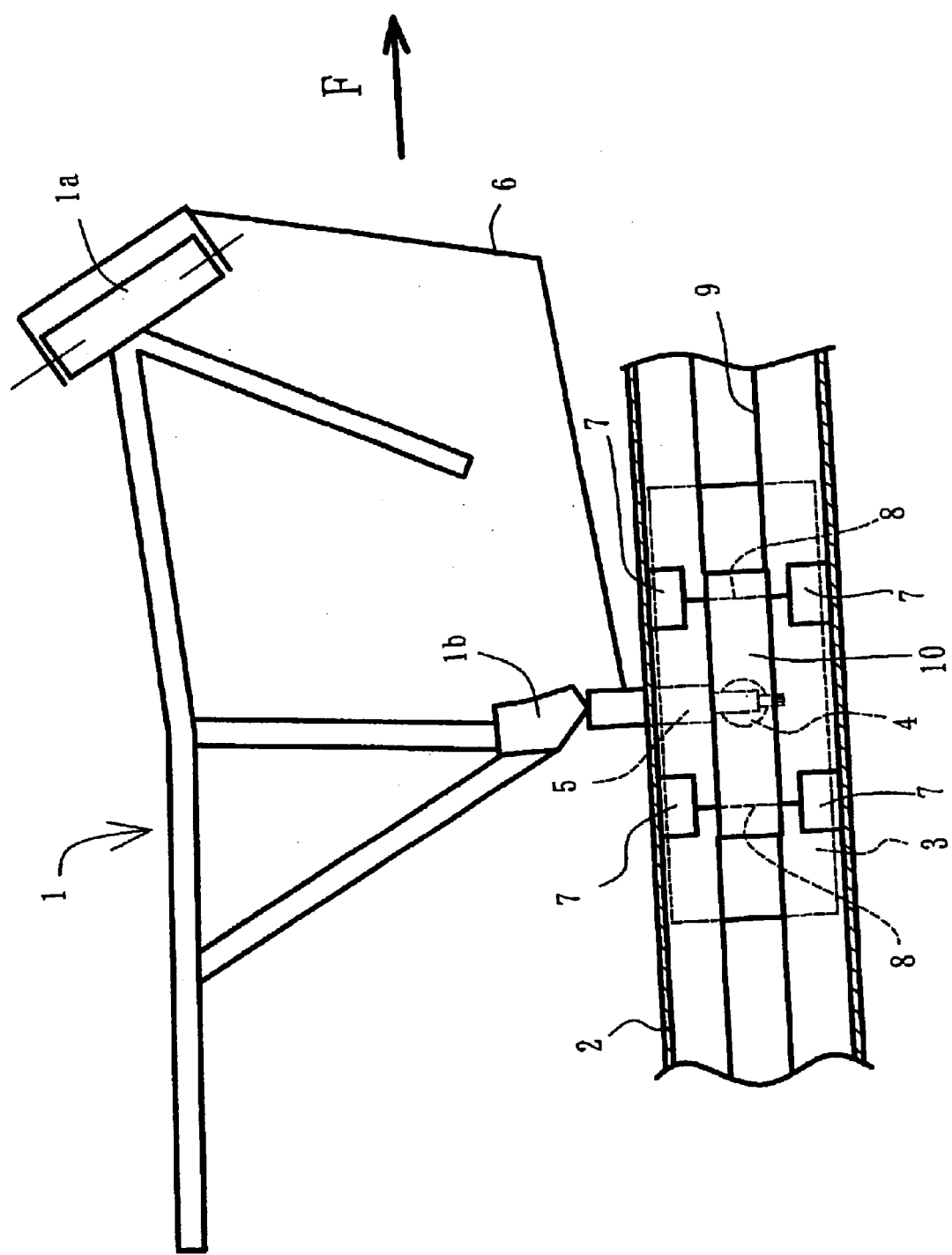
FIG. 2 is a side view showing a floor conveyor position.
Figure 3:
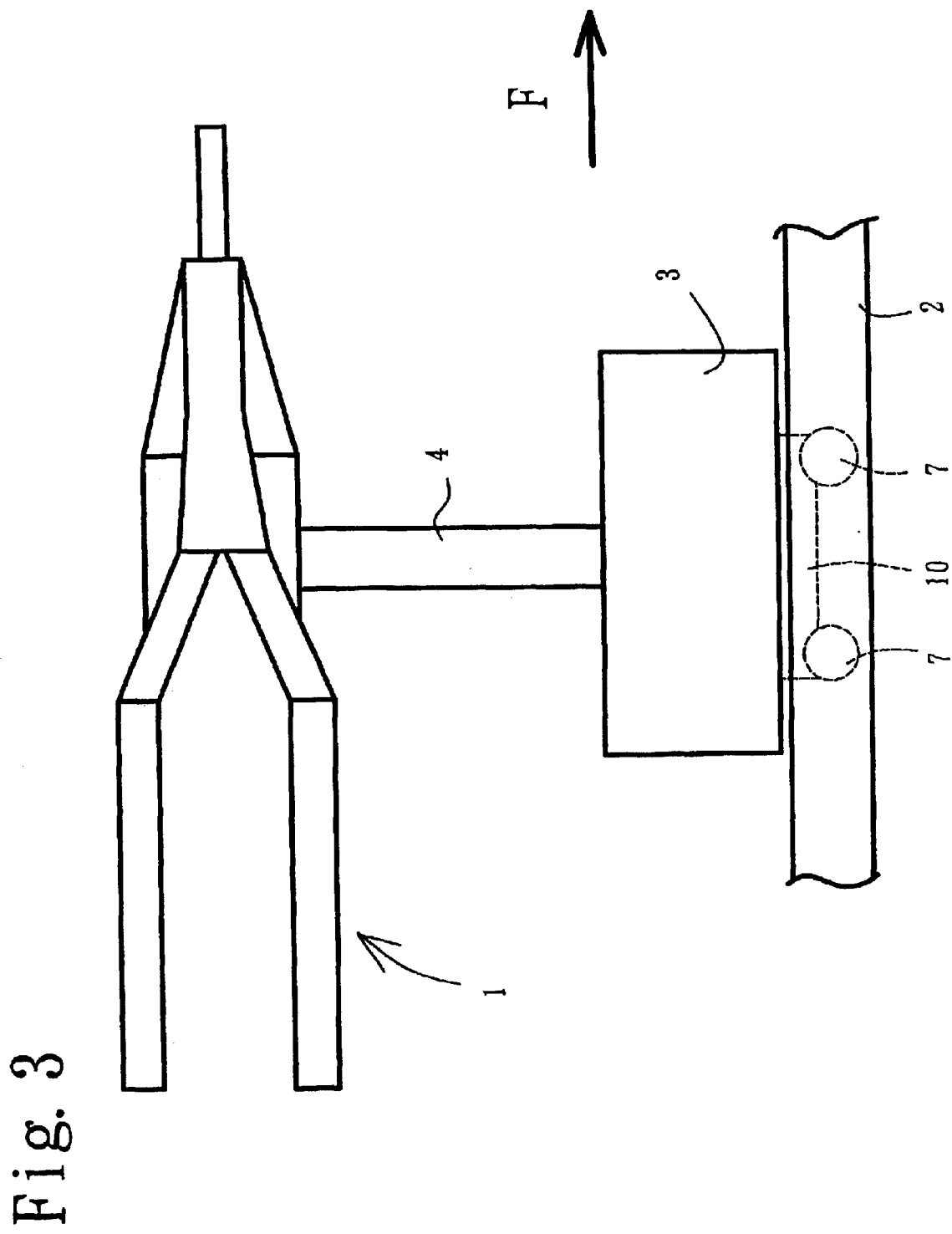
FIG. 3 is plan view thereof.
Figure 4:
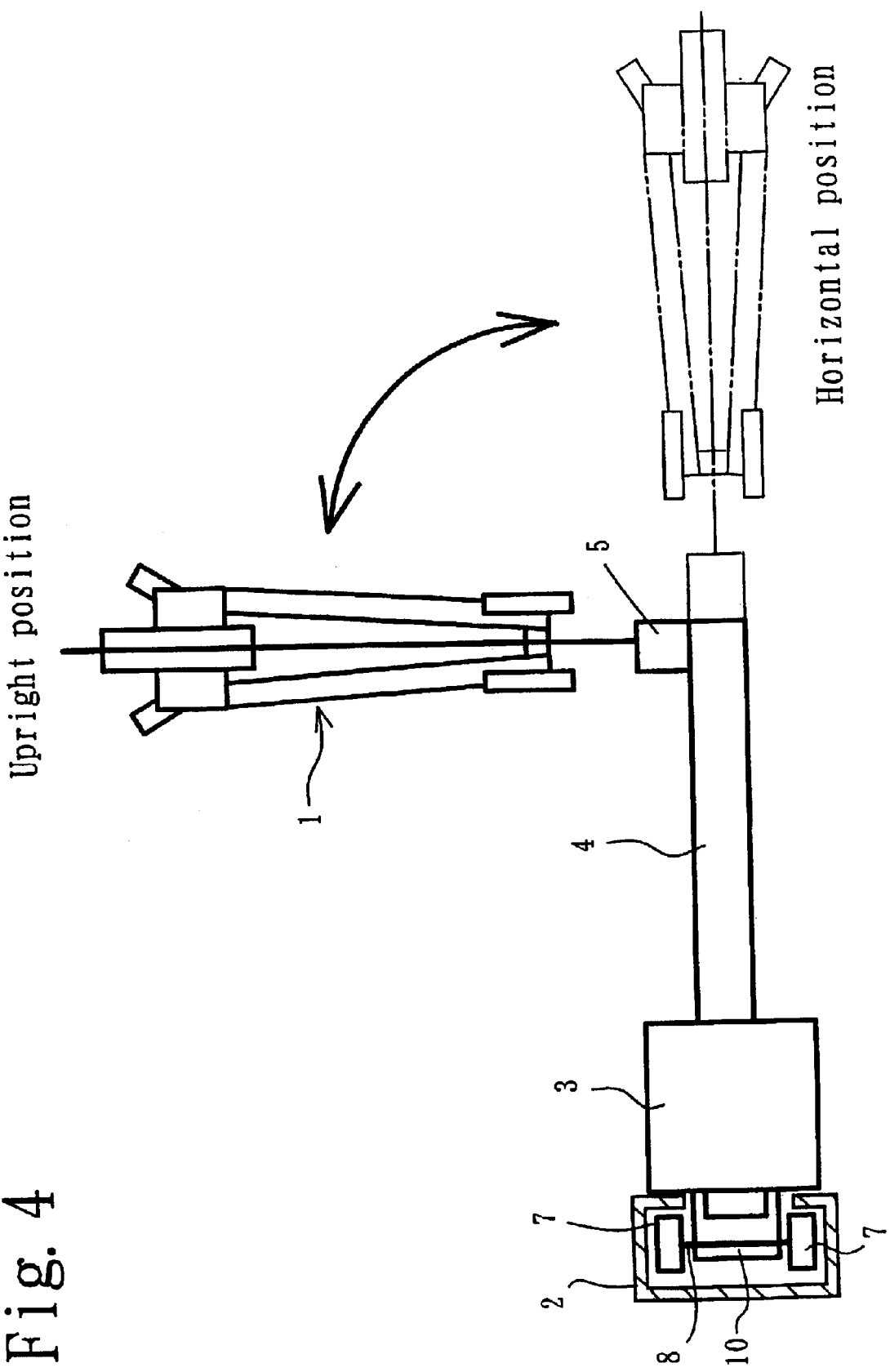
FIG. 4 is a front view thereof.

FIG. 2 is a side view showing a supporting condition of the workpiece 1 in the floor conveyor position and FIG. 3 is a plan view thereof. FIG. 4 is a front view of the workpiece 1 seen from the direction of travel F. As shown in these figures, the carrier 3 is moveably supported in the longitudinal direction on one side of the conveyor 2 and a rotational shaft 4 extending substantially in a level plane laterally from the carrier 3 is rotatable 360° around its axis. One end of a vertical arm 5 is connected to one end of the rotational shaft 4 substantially at right angles and the other end of the vertical arm 5 supports a center lower portion 1b of the workpiece 1. A front part 1a of the workpiece 1 is fixedly secured to an end of an auxiliary stay 6 bent and extending from the vertical arm 5.

With this construction, the workpiece 1 is situated laterally away from the carrier 3 and the conveyor 2. The workpiece 1 is supported in an upright position, i.e. in the condition in which a motorcycle is used, within a plane parallel to the direction of travel F and parallel to the direction perpendicular to the direction of travel F (hereinafter referred to as "a vertical plane"). The workpiece 1 is arranged to be rotatable by the rotational shaft 4 within the same vertical plane.

The vertical arm 5 is moveably arranged between an upright position substantially at right angles to the rotational shaft 4 and a position in a level plane substantially parallel to the rotational shaft 4. Thus, the workpiece 1 is moveable within another plane (hereinafter referred to as "a horizontal plane") perpendicular to the vertical plane and substantially parallel to the rotational shaft 4 and a vertical line. In addition, when the workpiece 1 is rotated substantially 90° from the upright condition, the workpiece reaches the side conveyor position substantially in a level plane (see a virtual line condition of FIG. 4). A position control mechanism is provided to control these workpiece positions, wherein there is a vertical rotation mechanism and a horizontal rotation mechanism.

Figure 5:
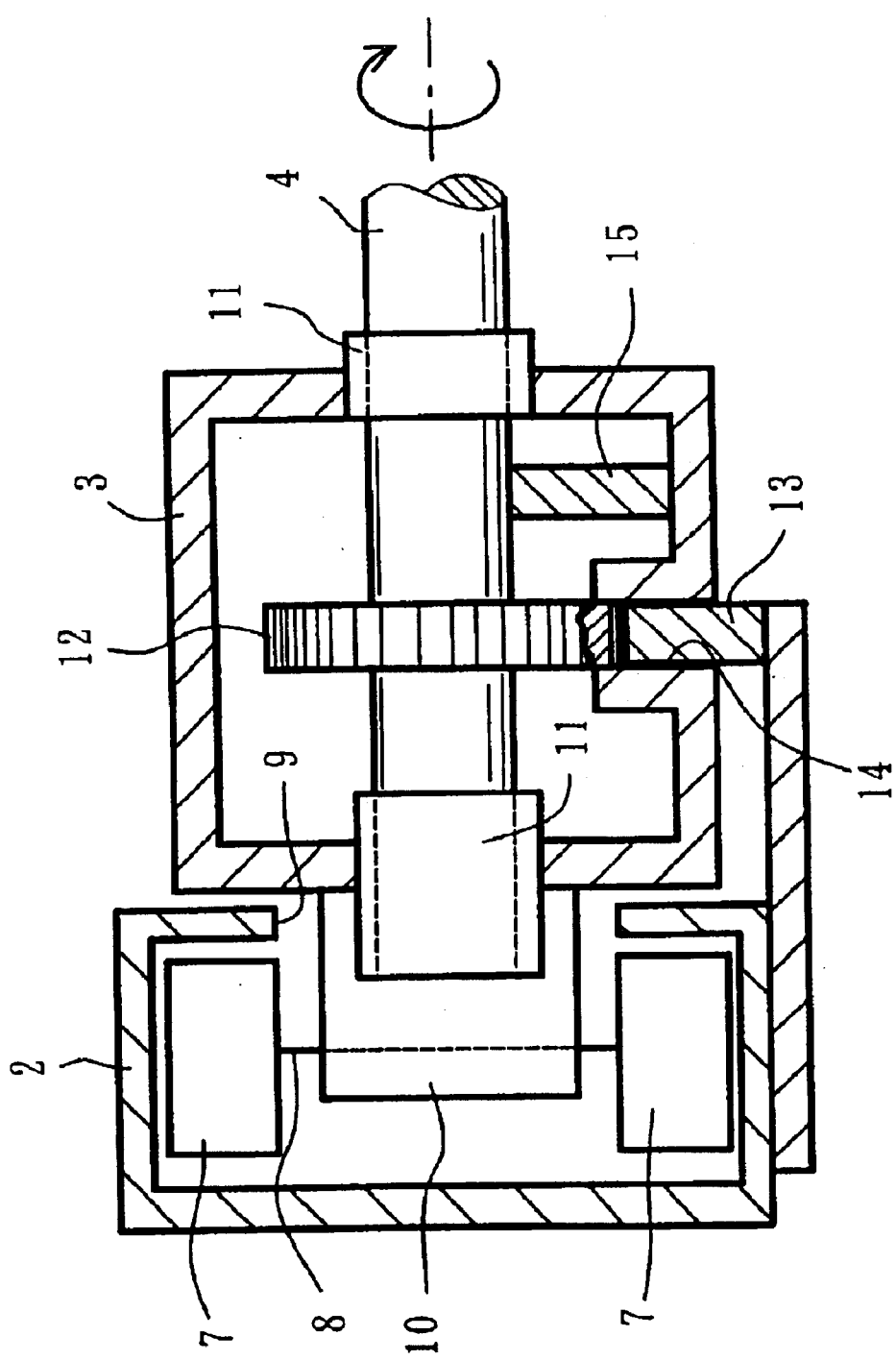
FIG. 5 is a cross sectional view showing basic parts of a vertical rotation mechanism.
Figure 6:
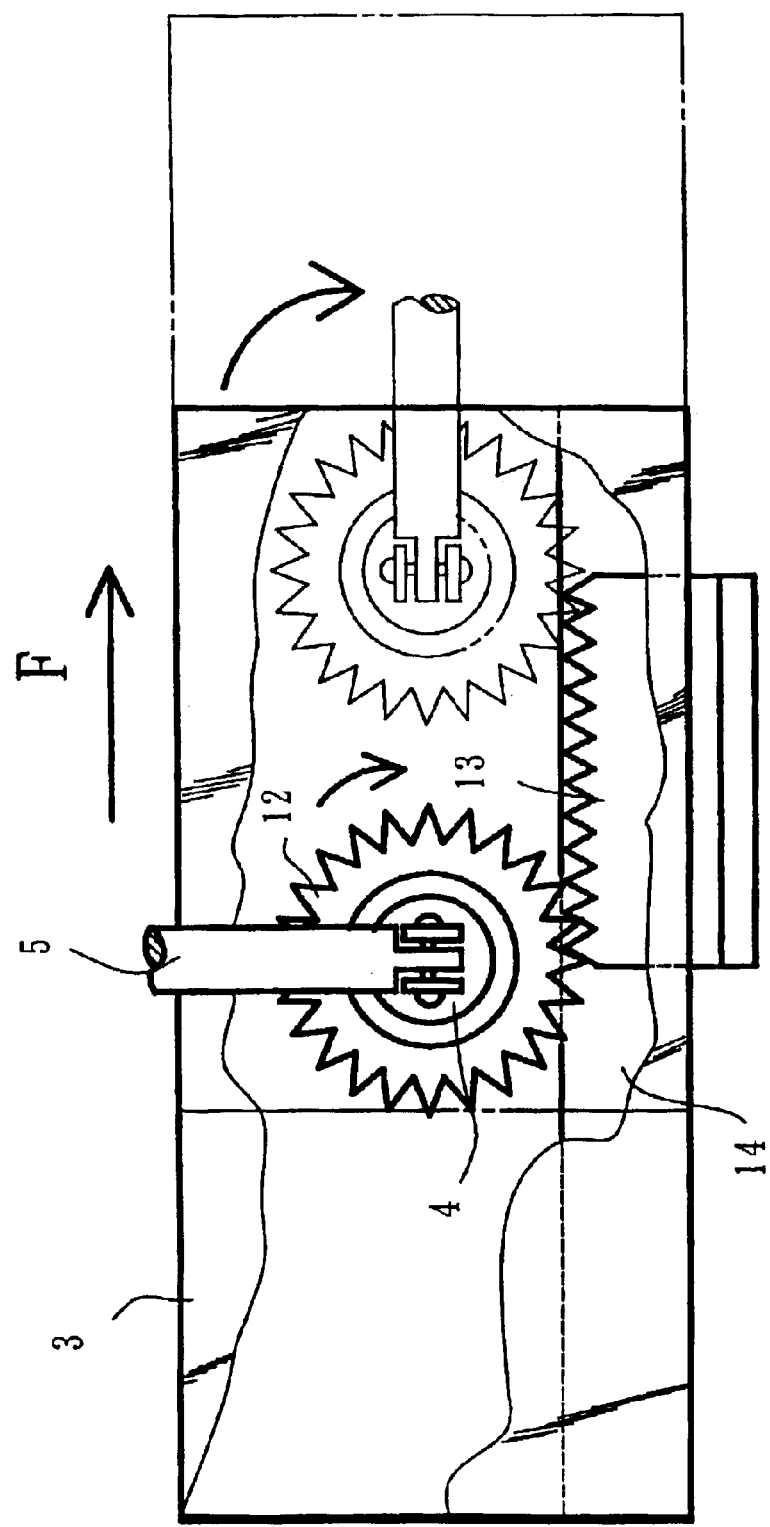
FIG. 6 is a side view thereof.

FIG. 5 is a cross sectional view of basic parts for explaining the vertical rotation mechanism and FIG. 6 is a view of the vertical rotation mechanism in the direction of the rotational shaft 4. In these figures, the conveyor 2 is a guide rail of a substantially C-shaped cross section in which a pair of rollers 7 is housed, one roller above the other. Each roller is connected to the other by a roller shaft 8 and adapted to travel in the longitudinal direction of the conveyor 2 by a driving means (not shown) such as a cable which is housed throughout the length of the conveyor 2.

Four rollers are provided in two locations before and after the carrier 3, above and below relative to the one carrier 3. The rollers are supported on a connecting portion 10 of the carrier 3 projecting inside conveyor 2 through a slit 9 continuously formed in the longitudinal direction in the side of the conveyor 2 facing the carrier 3.

The carrier 3 is a box-like member with its long side extending to the front and rear. The rotational shaft 4 passes through the central portion of the carrier 3 and is rotatably supported by bearings 11 at locations where it crosses the carrier 3. The rotational shaft 4 within the carrier 3 is integrally provided with a pinion 12 around the middle portion between the right and left bearings 11 which engages a rack 13 arranged at the lower part of the carrier 3. The rack 13 is disposed parallel to the conveyor 2 and fixedly secured to the conveyor 2 and the like. The rack 13 also fits into a groove 14 passing through a bottom portion of the carrier 3 in the front and rear direction.

When the carrier 3 travels in a condition where the pinion 12 has engaged the rack 13, the pinion 12 rotates. As a result, the rotational shaft 4 integrally formed with the pinion 12 rotates and the vertical arm 5 integrally formed with the rotational shaft 4 rotates, thereby vertically rotating the workpiece 1 which is supported by the vertical arm 5. The angle of rotation of the workpiece 1 corresponds to that of the pinion 12, which relates to the distance that the pinion 12 and the rack 13 travel upon their engagement.

The rack 13 may be continuously provided over the length of the conveyor 2 or may be provided at suitable intervals for each length corresponding to a rotation angle required for each location necessary to rotate the rotational shaft 4. When the rack 13 is continuously provided throughout the length of the conveyor 2, the workpiece 1 moves while continuously undergoing vertical rotation and therefore each process is adapted to agree with the cycle of this vertical rotation.

On the contrary, when the rack 13 is intermittently provided at any optional locations, the workpiece 1 can be vertically rotated only in the necessary processes according to the continuing processes. If there is any process in which the vertical rotation of the workpiece 1 is not required, the rack 13 is not required to release the pinion 12. However, in this case, to maintain a predetermined workpiece position, it is necessary to control the rotation of the rotational shaft 4. For example, the rotation can be controlled by suitable control means such as a brake 15 that is provided within the carrier 3.

Figure 7:
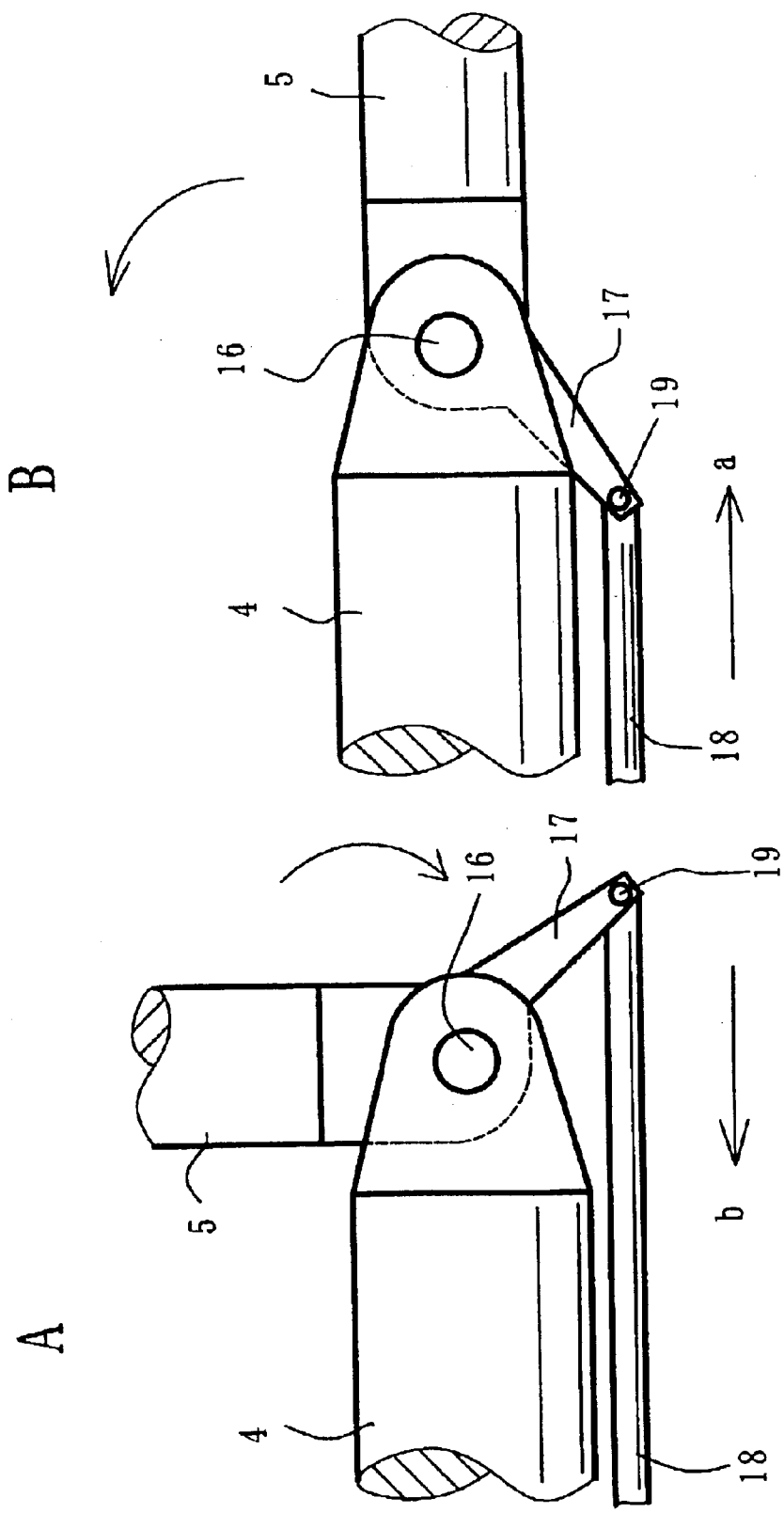
FIGS. 7A and 7B are views showing a horizontal rotation mechanism.

FIG. 7 shows the horizontal rotation mechanism in which the ends of the rotational shaft 4 and the vertical arm 5 are interconnected by a shaft 16 so as to allow the vertical arm 5 to stand upright or be positioned in a level plane. The end of the vertical arm 5 is integrally provided with a projection 17 extending therefrom and the projecting end of the projection 17 is connected to an end of a control rod 18 provided substantially parallel to the rotational shaft 4 by a shaft 19.

The other end of the control rod 18 is not shown here, but is connected to a control member provided within the carrier 3. When the control rod 18 is pushed by the control member to the right-hand side of the figure (in the direction of the arrow a), the vertical arm 5 is caused to stand upright (FIG. 7A) so as to allow the workpiece 1 to stand upright. On the contrary, when the control rod 18 is pulled to the left-hand side of the figure (in the direction of the arrow b), the vertical arm 5 is caused to be positioned in a level plane (FIG. 7B). The workpiece 1 is then caused to realize the side conveyor position (see FIG. 4).

Figure 8:
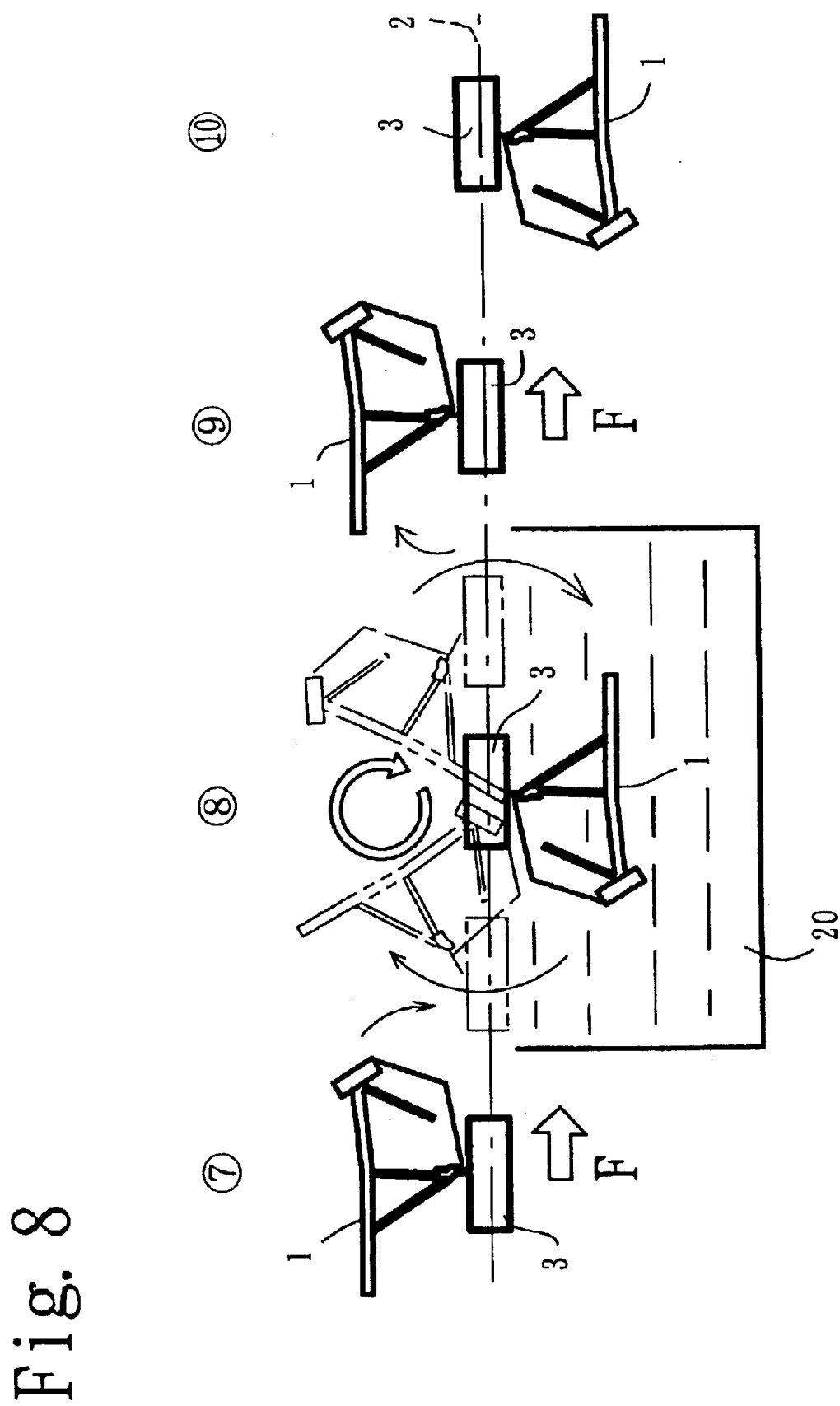
FIG. 8 is a view showing position control of a workpiece in electrodeposition coating.

The workpiece position when the workpiece 1 is vertically rotated into the electrodeposition coating C will now be explained hereunder. In this process, as shown on an enlarged scale in FIG. 8, the workpiece 1 is maintained in the floor conveyor position in a draining process that is the last process of the pretreatment B. When the workpiece 1 is then subject to the electrodeposition coating C, the front part of the workpiece 1 starts to submerge in an electrodeposition paint bath 20 while vertically rotating and then completely submerge in the electrodeposition paint bath 20 in the overhead conveyor position.

Within the electrodeposition paint bath 20, the workpiece 1 continues to rotate vertically and its front part begins to emerge from the liquid surface. After the workpiece 1 has completely emerged from the liquid surface, it returns to its original floor conveyor position and the dipping process is completed.

The workpiece 1 still continues to rotate vertically and reaches the floor conveyor position, the overhead conveyor position and the floor conveyor position in turn to complete the washing process. Circled numerals in the figure correspond to the process numbers of FIG. 1.

When the workpiece 1 is vertically rotated within the electrodeposition bath 20, it is possible to perform the electrodeposition coating satisfactorily and efficiently. Since at least a part of the workpiece 1 is dipped in almost of this process, the proportion of loss of time not relating to dipping but required only for moving the workpiece 1 into and removing it from the bath, relative to the substantial dipping time, can be reduced, therefore the electrodeposition time can also be reduced. Also, when the workpiece 1 is removed from the electrodeposition bath 20, it emerges at a constant speed, front part first. It is therefore possible to allow the excess paint to run off and at the same time to realize uniform painting.

Thus, even when in a single treatment, it is necessary to move the workpiece to the floor conveyor position and to the overhead conveyor position, it is no longer necessary to transfer the carrier 3 to the floor conveyor or the overhead conveyor each time. Since the workpiece positions can also be continuously changed keeping the conveyor 2 in a fixed state, it is possible to considerably reduce the time required for changing the workpiece positions.

Figure 9:
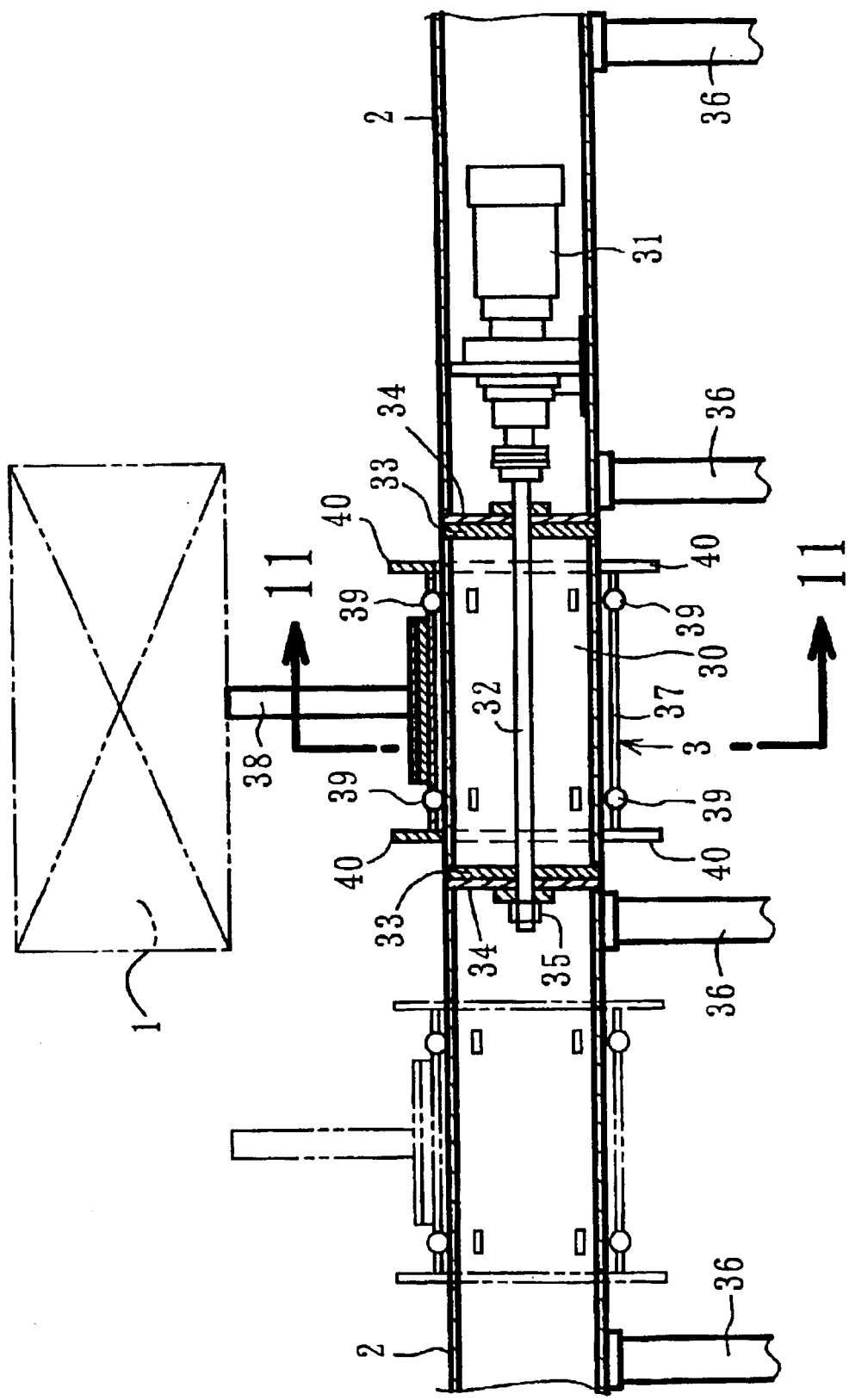
FIG. 9 is a cross sectional view of a conveyor on the side of a movable portion according to a second embodiment (FIGS. 9 to 13)
Figure 10:
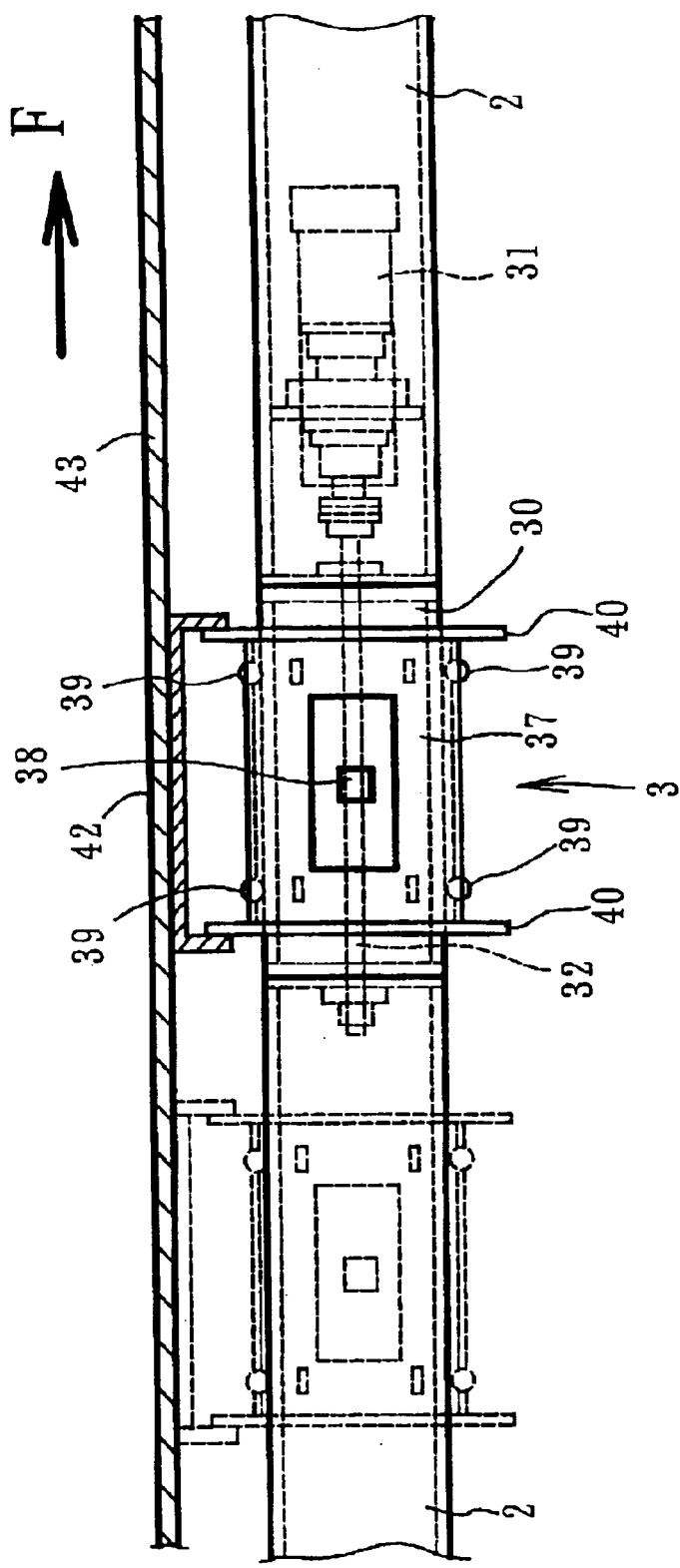
FIG. 10 is a plan view thereof.
Figure 11:
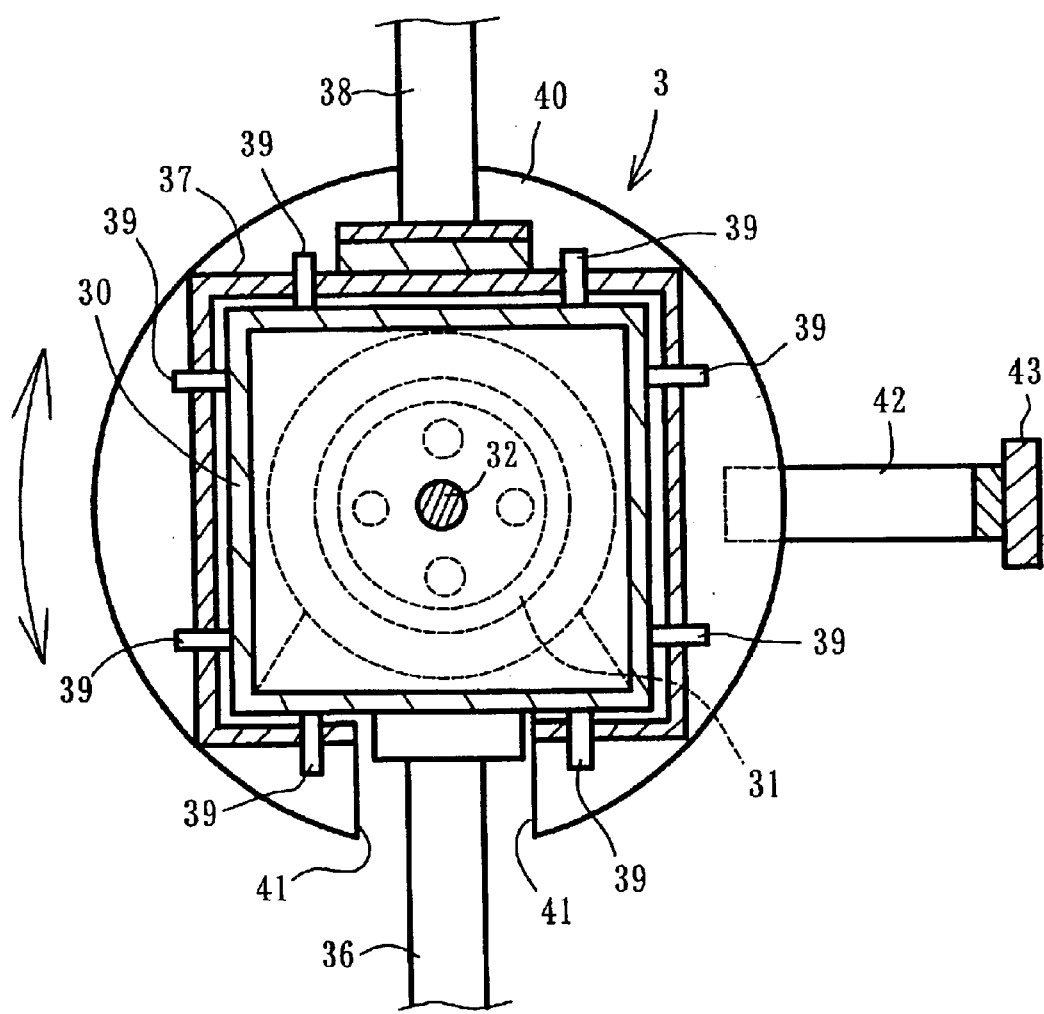
FIG. 11 is a cross sectional view taken along the line 11—11 of FIG. 9.
Figure 12:
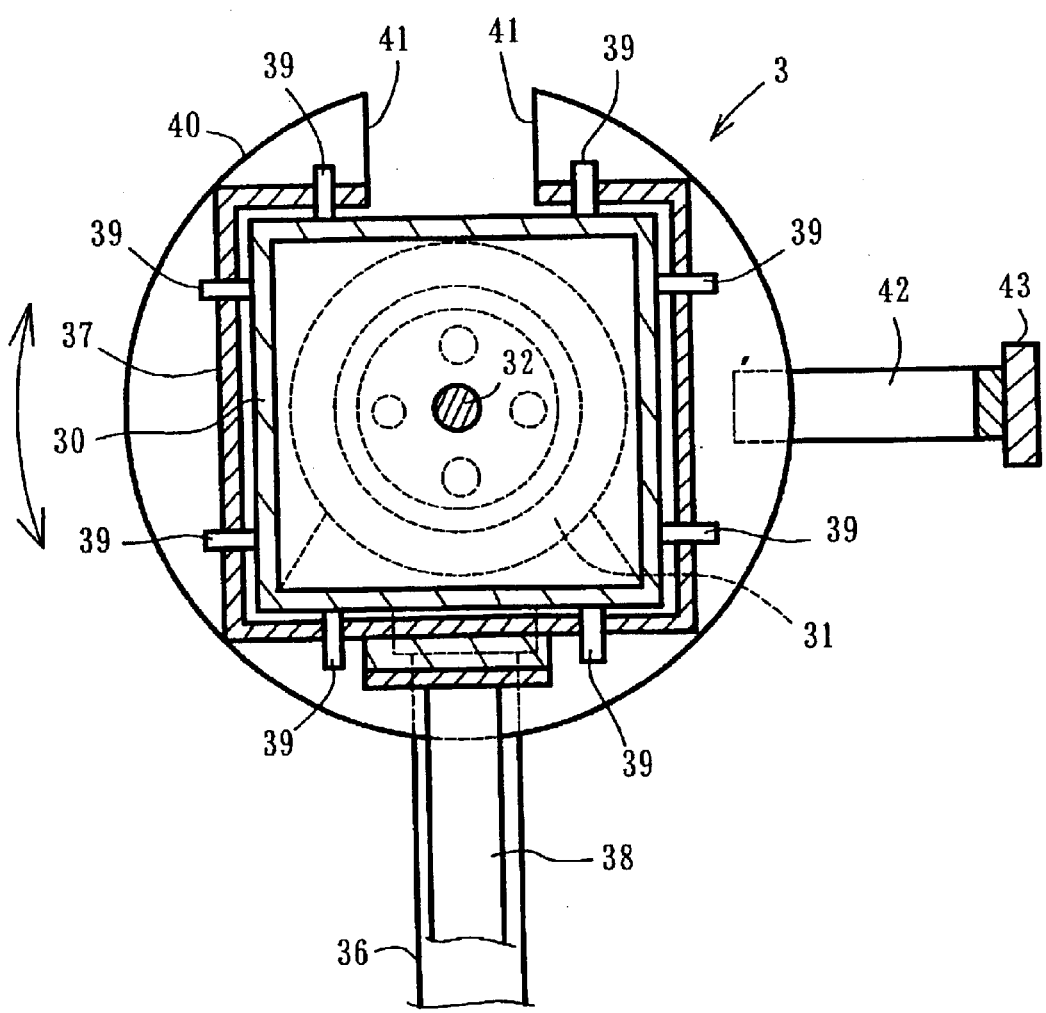
FIG. 12 is view showing an operation condition of FIG. 11.

Next, a second embodiment in which a part of the conveyor 2 is moveable to allow horizontal rotation will be explained. FIGS. 9 to 12 relate to the second embodiment, in which FIG. 9 is a side view showing a part of the conveyor 2 cut away and FIG. 10 is a plan view thereof. FIG. 11 is a cross sectional view taken along the line 11—11 of FIG. 9. FIG. 12 is the same view as FIG. 11 showing a rotating condition.

In these figures, the conveyor 2 is a hollow member of substantially square cross section. A position for use in a process in which the workpiece is necessary to be changed from the floor conveyor position to the overhead conveyor position and the like at a part of the conveyor 2 is a separate moveable portion 30.

This moveable portion 30 has the same cross section as the front and rear of the conveyor 2 and is arranged to be horizontally rotatable in a plane perpendicular to the direction of travel F of the conveyor 2. Namely, the moveable portion 30 is positioned between the front and rear at the conveyor 2, and a step motor 31 is fixedly secured to the inside of one side of the conveyor 2. The rotational shaft 32 of the step motor 31 is provided parallel to the center of the conveyor 2 and the moveable portion 30 and arranged to penetrate vertical walls 33 provided before and after the moveable portion 30. The rotational shaft 32 engages the vertical walls 33 to integrally rotate with them.

An end of the rotational shaft 32 is fixedly secured to a vertical wall 34 of the other side of the conveyor 2 by a nut 35. With this construction, when the step motor 31 rotates by a predetermined amount, the moveable portion 30 integrally connected to the rotational shaft 32 integrally rotates horizontally to an angle corresponding to the amount of rotation of the step motor 31.

The bottom surface of the conveyor 2 is supported on a floor by support pillars 36 which are provided at fixed intervals in the longitudinal direction. The moveable portion 30 is not provided with the support pillars 36 so as to be rotatable. The carrier 3 has a main body portion 37 of a square hole shape which is slightly larger than the conveyor 2 and the moveable portion 30. The main body portion 37 is formed to have similar figures with the conveyor 2 and the moveable portion 30. Since the conveyor 2 and the moveable portion 30 can pass through the inside of the main body portion 37, the carrier 3 is guided along the conveyor 2 and the moveable portion 30 to be moveable in the direction of travel like a monorail.

One end of a supporting rod 38 is integrally provided on the upper surface of the main body portion 37 and the workpiece 1 is supported by the other end of the supporting rod 38. Rollers 39 are rotatably supported in a total of four places, front and back and right and left of each surface, and arranged to roll on each surface of the conveyor 2 and the moveable portion 30.

Circular plate-shaped flanges 40 are provided at the front and rear ends of the main body portion 37. A part of each flange 40 that becomes the lower part when in the floor conveyor position is formed with a cut out portion 41 to avoid interference by the support pillars 36 during travel. The flange 40 always engages a substantially C-shaped engaging member 42 and the engaged condition is maintained even though the carrier 3 rotates horizontally. The engaging member 42 is fixedly secured to a belt-shaped conveyance-driving member 43 which is arranged parallel to the conveyor 2. As the conveyance-driving member 43 moves in the direction of travel F, the engaging member 42 also moves in the direction of travel F on either the conveyor 2 or the moveable portion 30 irrespective of the horizontal rotation of the carrier 3.

Figure 13:
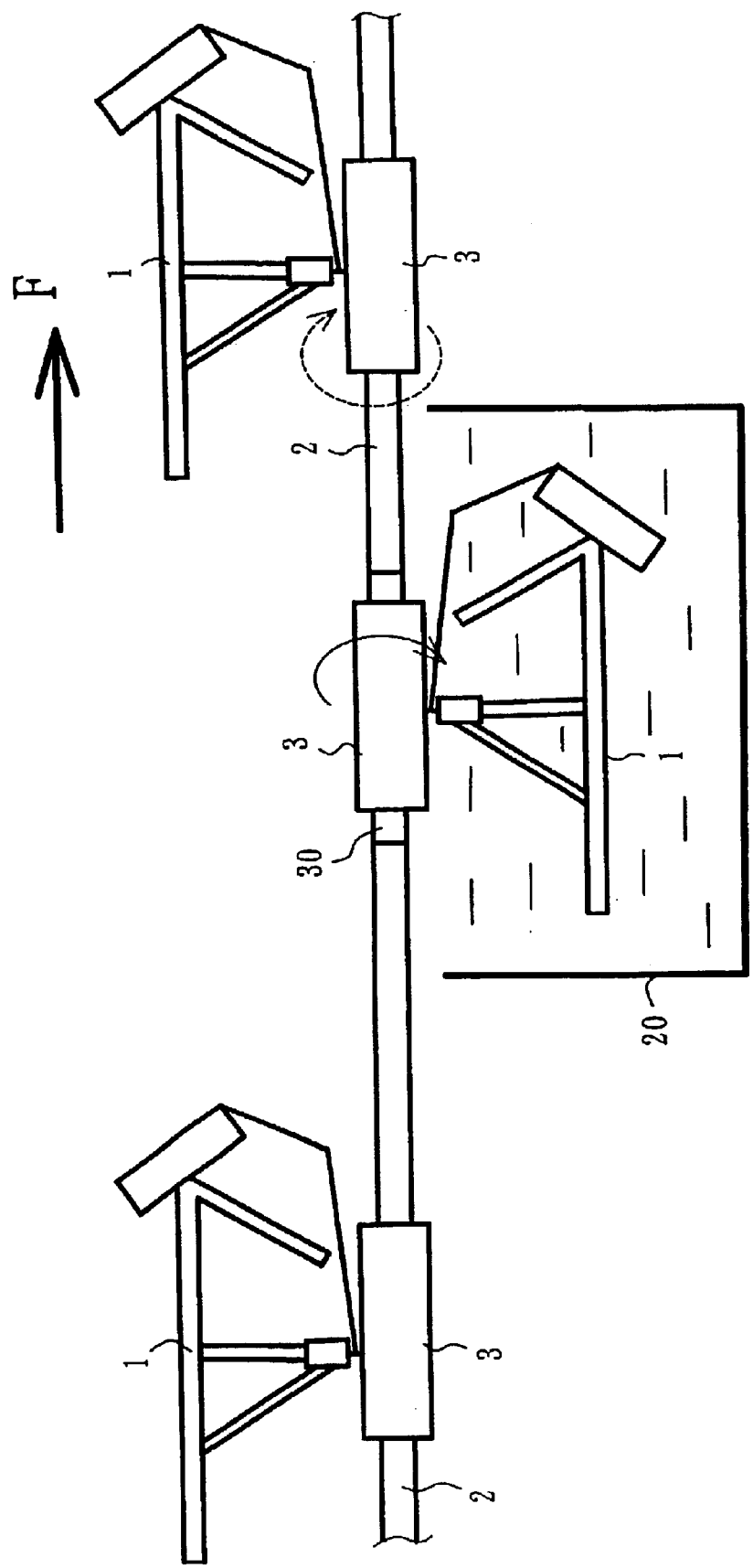
FIG. 13 is a view showing position control of the workpiece in electrodeposition coating.

An operation of the present embodiment will now be described. FIG. 13 shows the electrodeposition coating process C in which the carrier 3 moves on the conveyor 2 in the floor conveyor position. Once the carrier 3 reaches the moveable portion 30 of the conveyor 2 provided above the electrodeposition paint bath 20, it stops moving. Next, when the step motor 31 is rotated 180°, the carrier 3 also rotates horizontally 180° through the vertical wall 33 integrally provided with the rotational shaft 32.

Thus, the workpiece 1 rotates horizontally to the overhead conveyor position and the like and is then inserted into the electrodeposition paint bath 20. After the paint adheres to the workpiece 1 in the dipping process, the workpiece 1 is rotated 180°, emerges from the electrodeposition paint bath 20 and returns to the original floor conveyor position.

In this case, by setting the step motor 31, it is possible to either allow the workpiece 1 to continuously rotate horizontally or to allow it to rotate intermittently within the electrodeposition paint bath 20. It is therefore possible to realize satisfactory electrodeposition painting by allowing the workpiece 1 to move within the electrodeposition paint bath 20.

Further, since the conveyor 2 does not move vertically, but is linearly maintained in the same horizontal plane, it is possible to immediately insert the workpiece 1 into the dipping process. As a result, the time lost when the dipping is not substantially performed, i.e. when the workpiece 1 is inserted into and removed from the electrodeposition paint bath 20, can be remarkably reduced, and the total painting time can be reduced.

Still further, the workpiece 1 can be horizontally rotated to change the workpiece position to the floor conveyor position and to the overhead conveyor position, and the like. Accordingly, even when the workpiece position must be changed for each subsequent process (e.g. 13 to 15), it is no longer necessary to transfer the workpiece 1, and loss of time can be reduced. It is particularly suitable for a tact treatment in which conveyance is temporarily stopped for each process (e.g. 13 to 15) for necessary treatment.

Since a part of the conveyor 2 itself is arranged to serve as the moveable portion 4, it is possible to strengthen the moveable portion 4 and simplify the construction comparatively. Also, the rotational means can be easily provided by the step motor 5 and when the step motor 5 is used, it can be easily housed in the hollow portion of the conveyor 2 whereby the rotational direction and angle thereof can be freely controlled.

Since the carrier 3 is supported on the conveyor 2 like a monorail, the supporting construction for the carrier 3 is simplified and strengthened and it is possible to stabilize the conveyance of the workpiece 1. It is especially suitable when a heavy workpiece 1 is supported. Further, the carrier 3 is provided with flanges 14 that engage the engaging member 16 of the carrier feeding member 17 provided parallel to the conveyor 2. Even if the carrier 3 rotates, engagement of the flanges 14 with the engaging member 16 is maintained to allow the carrier 3 to move. It is therefore suitable for a mechanism capable of moving the carrier 3 irrespective of the rotational position of the carrier 3.

Figure 14:
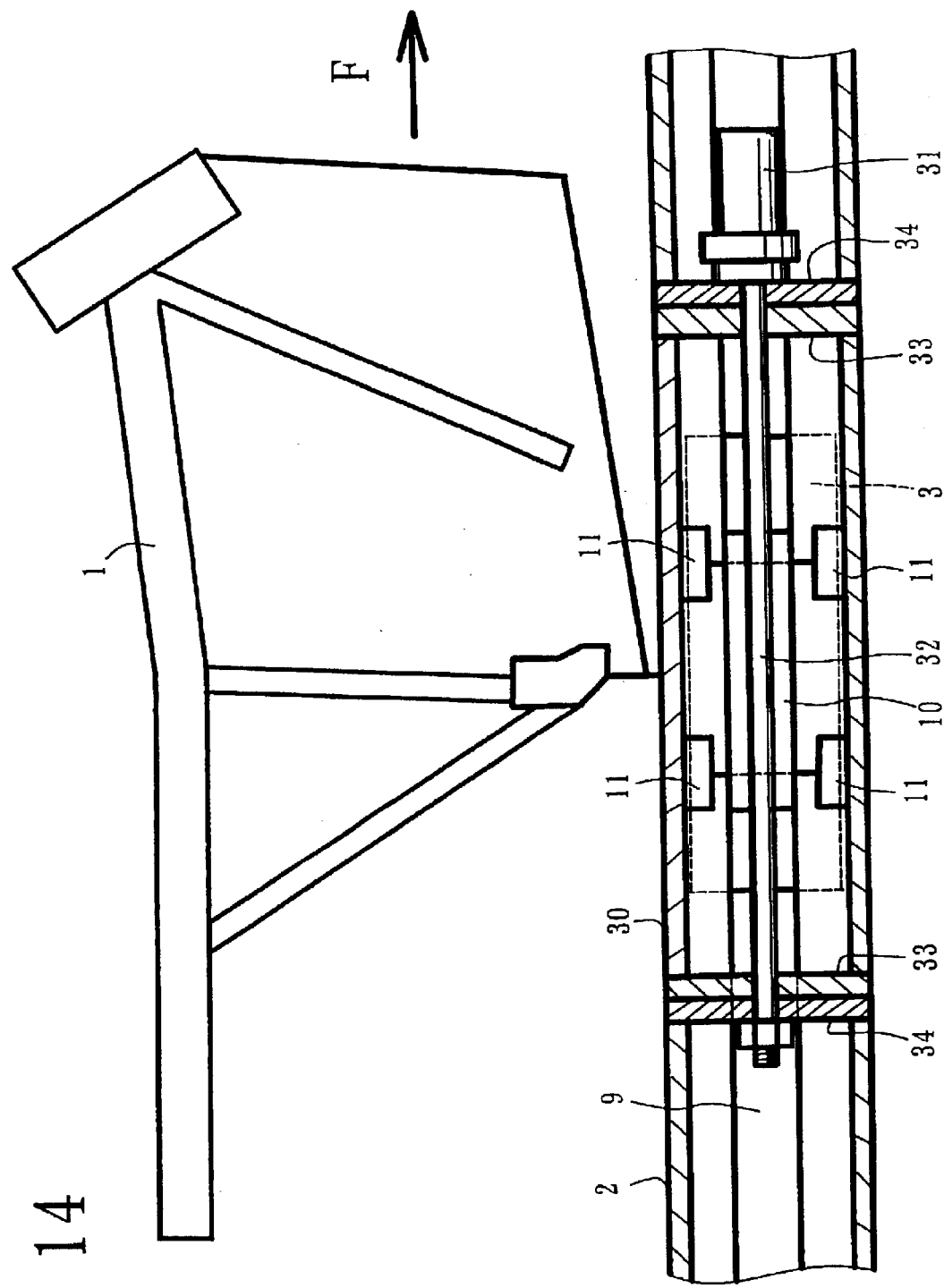
FIG. 14 is a cross sectional view of the conveyor on the side of the moveable portion according to a third embodiment (FIGS. 14 to 16)

Next, a third embodiment regarding the same horizontal rotation mechanism as above will be described. FIG. 14 is a side view of the moveable portion of the conveyor partially cut away and FIGS. 15A and 15B are plan views showing the operation thereof. FIGS. 16A and 16B are views showing the operation of the horizontal rotation mechanism from the direction of travel F and from the front, respectively.

In these figures, the conveyor 2 is formed in a hollow box shape and provided in one part with a moveable portion 30. The moveable portion 30 is situated between two sides of the conveyor 2 and is rotated by a step motor 31 which is fixedly secured to the inside of one side of the conveyor 2. A rotational shaft 32 of the step motor 31 passes through a vertical wall 33 of the moveable portion 30 and extended to the other side of the conveyor 2. One end of the rotational shaft 32 is fixedly secured to a vertical wall 34 provided on the other side of the conveyor 2. The moveable portion 30 rotates synchronously with the rotational shaft 32 when the vertical walls 33 and the rotational shaft 32 are integrally rotated.

The carrier 3 is so connected as to move along each side of the conveyor 2 and the moveable portion 30. A projection 10 of the carrier 3 projects to the inside of the conveyor 2 and the moveable portion 30 through slits 9 continuously formed in each side thereof in the longitudinal direction. The projection 10 supports rollers 11 that are provided at four-corners, back and front and upper and lower. The carrier 3 can be moved by the rollers 11 which roll on the inside of the conveyor 2 and the moveable portion 30 and is moved in the direction of travel by suitable driving means not shown here.

Figure 15:
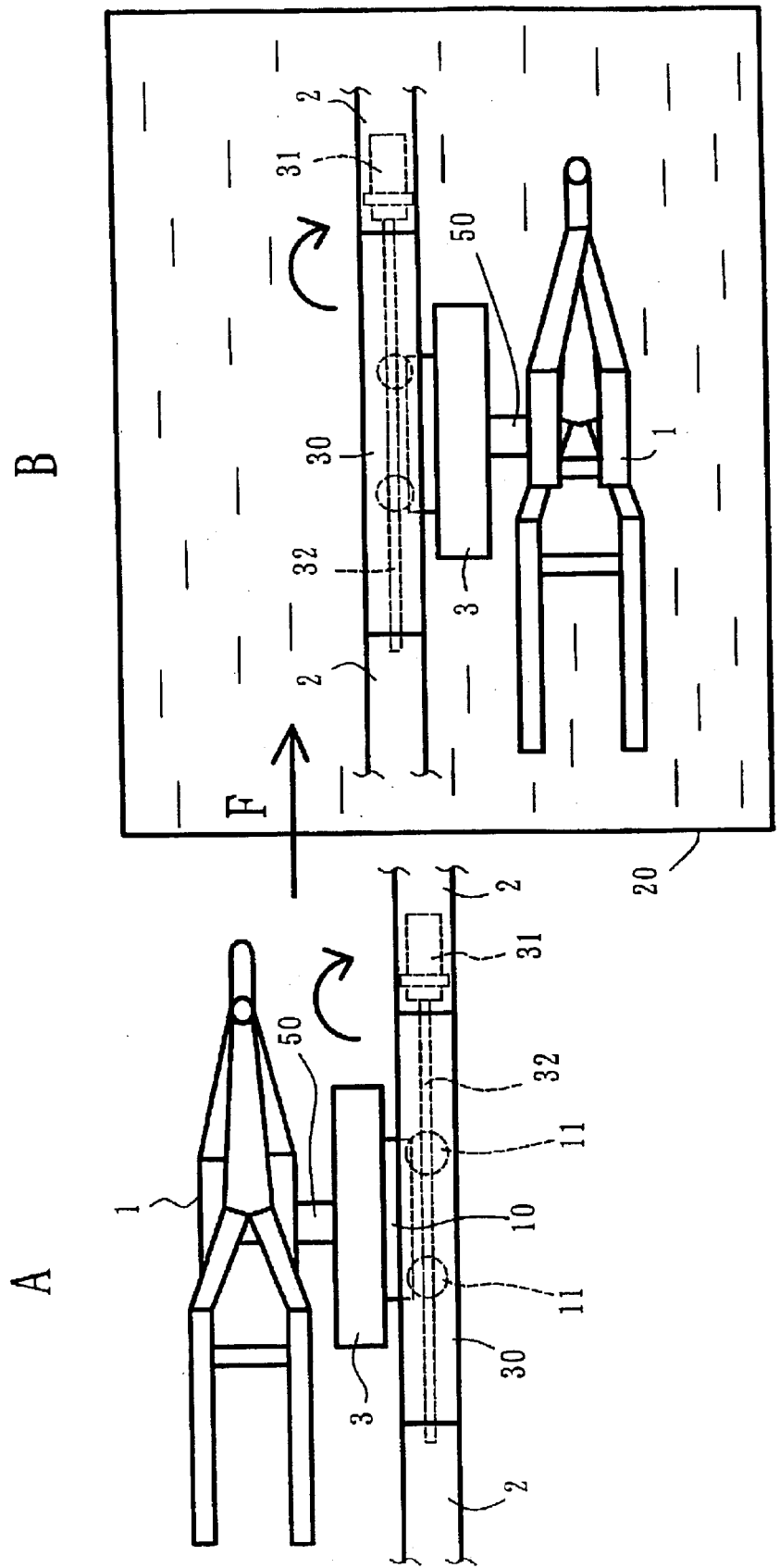
FIGS. 15A and 15B are plan views thereof together with an operation.
Figure 16:
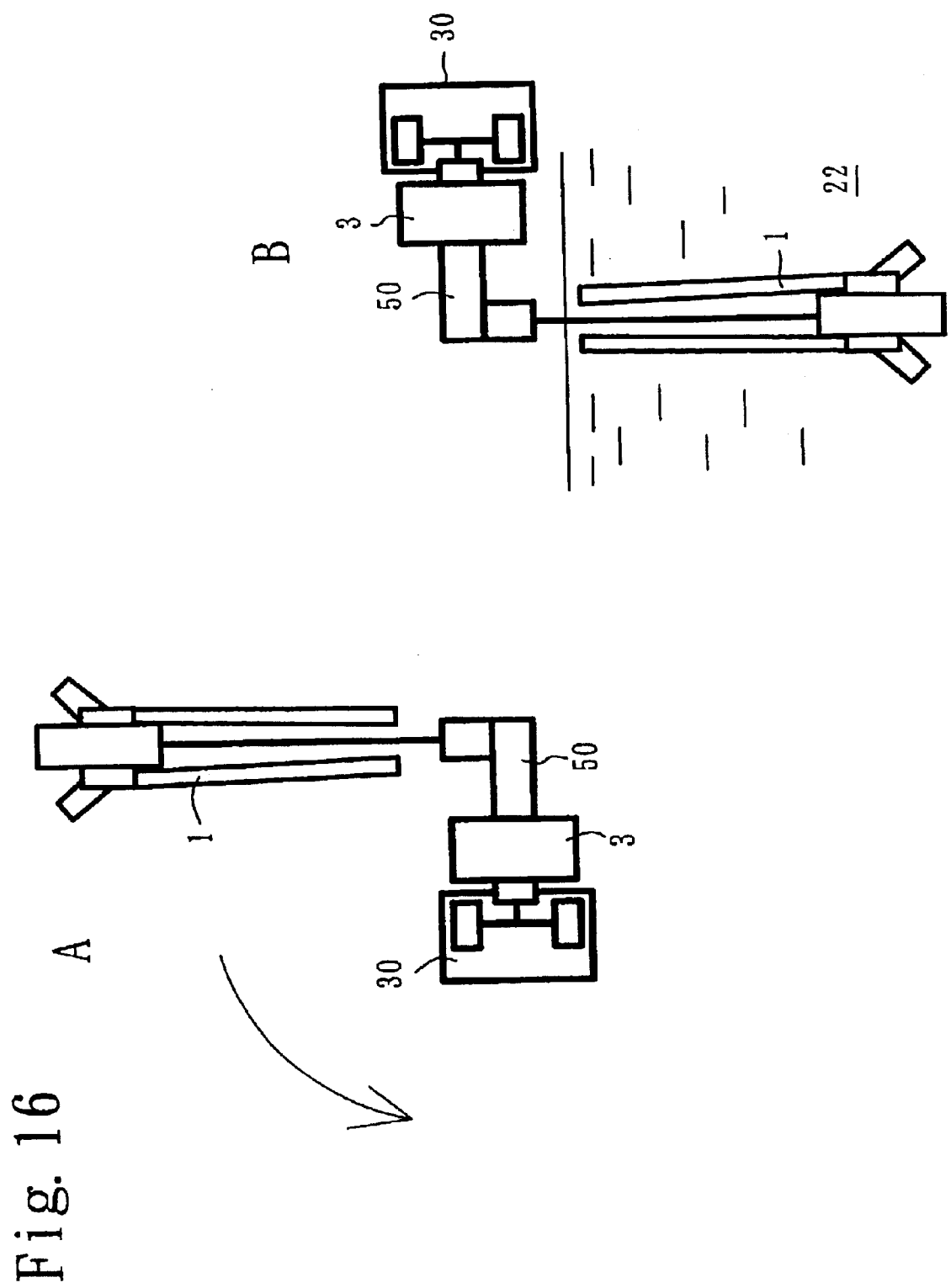
FIGS. 16A and 16B are views showing the moveable portion from the front side of the direction of travel F together with the operation thereof.
Figure 17:
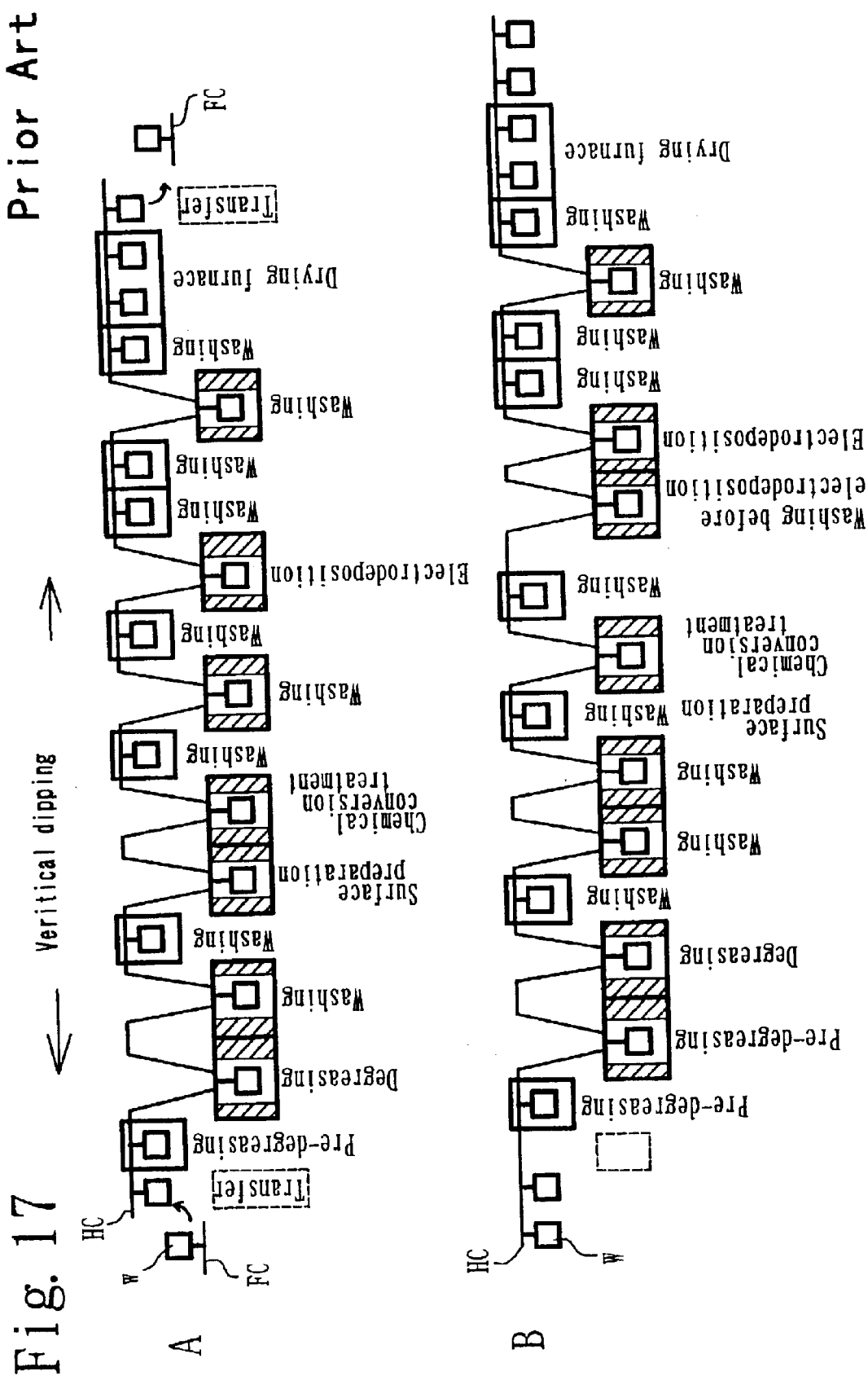
FIGS. 17A and 17B are process charts for a conventional painting line.

As is obvious from FIGS. 15 and 16, a horizontal arm 50 extends laterally from one side of the carrier 3, and one end of the arm 50 supports the workpiece 1 such as a motorcycle in a suitable condition (see FIG. 16A). As shown in FIG. 15 A, the workpiece 1 is supported on one side of the conveyor 2 and the moveable portion 30 (on the left side in the present embodiment).

An operation of the present embodiment will now be described. When the carrier 3 moves above the electrodeposition paint bath 20 of FIG. 16, it stops moving and the step motor 31 rotates 180°. As a result, the moveable portion 30 rotates horizontally to the overhead conveyor position and the like as shown in FIG. 16B, wherein the same dipping process as for the previous embodiment can be performed. Since the dipping process is the same as the previous embodiment, further description is omitted.

Thus, if the carrier 3 is formed in a type where it is supported on one side of the conveyor 2, the workpiece 1 can be supported laterally away from the conveyor 2. Therefore, substances such as dust or the like falling from the conveyance 2 are prevented from adhering to the workpiece 1. Accordingly, this type of a conveyance apparatus is suitable for a painting line in which adhesion of dirt is particularly undesirable.

Figure 18:
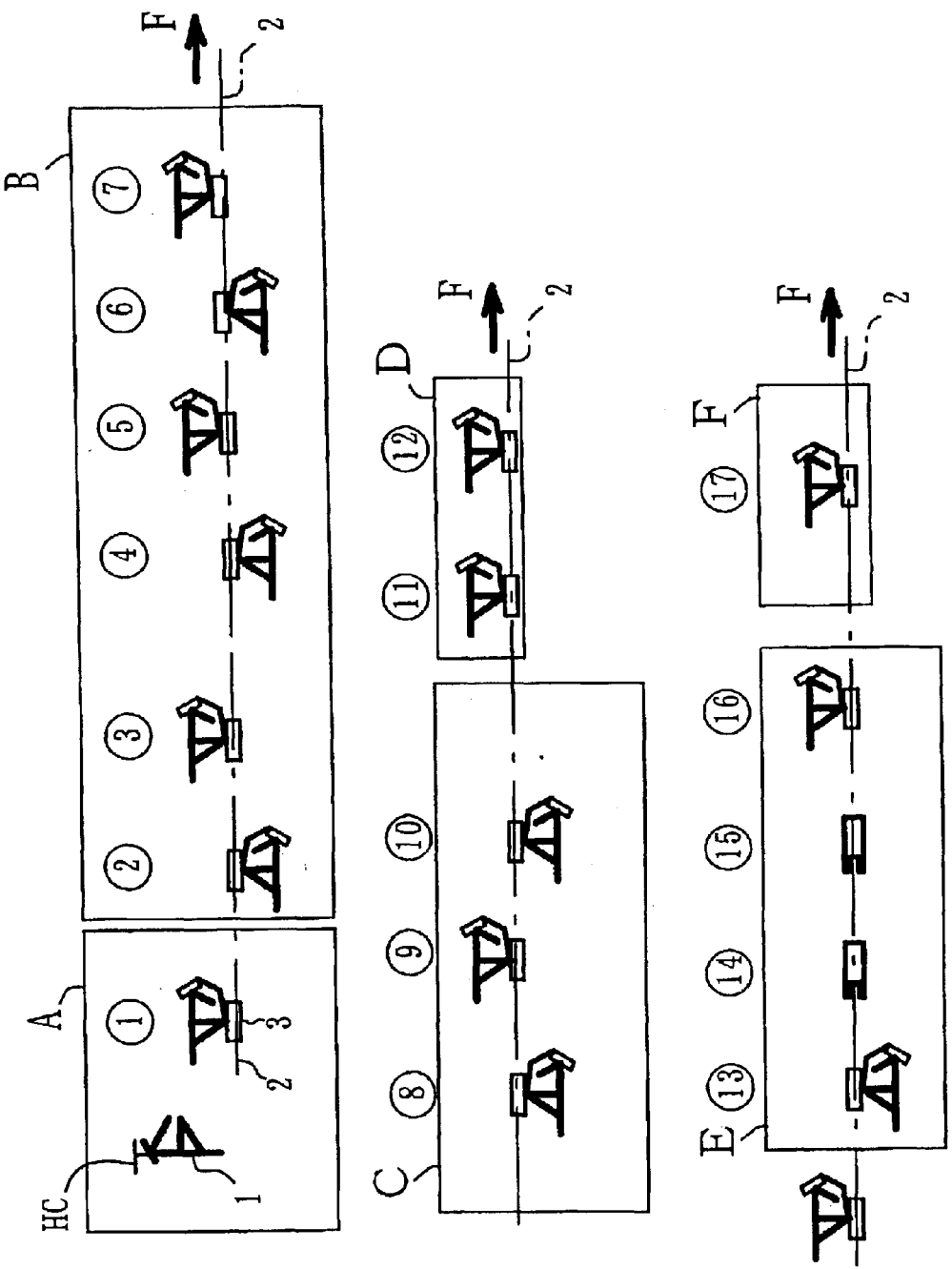
FIG. 18 is a process chart for a complete body painting line according to an embodiment.

FIG. 1 is a flow chart of a complete painting line adopted the horizontal rotation mechanism as described in the embodiment 2 and 3, which corresponding to FIG. 1. The preferred embodiments that have been applied to a painting line for a motorcycle will be described hereunder. In the painting line of FIG. 18, each process of loading and jig attachment A, pretreatment B, electrodeposition coating C, electro-deposition drying D, finish coating E and finish drying F is continuously performed in sequence. Encircled figures in the flow chart show the processes of FIG. 18. (The number of the process in the description is shown by the corresponding parenthesized figures.)

In the process of loading and jig attachment A, a workpiece 1 which is the body of a motorcycle has been hung and conveyed by an overhead conveyor HC of a welding line which is a process previous to this painting line. The workpiece 1 is then supported on a conveyor 2 through a carrier 3 in a floor conveyor position (1).

Now, in the process of pretreatment B, the workpiece 1 is horizontally rotated to change its position continuously to the floor conveyor position and to an overhead conveyor position, wherein each process of degreasing (2) (the overhead conveyor position), washing and surface preparation (3) (the floor conveyor position), chemical conversion treatment (4) (the overhead conveyor position), washing (5) (the floor conveyor position), washing (6) (the overhead conveyor position), and pure water washing and draining (7) (the floor conveyor position) is performed.

In the process of electrodeposition coating C, the workpiece 1 is likewise rotated horizontally to change its position continuously to the floor conveyor position and to the overhead conveyor position, wherein each process of the electrodeposition coating (8) (the overhead conveyor position), washing (9) (the floor conveyor position), washing (10) (the overhead conveyor position) and pure water washing (11) (the floor conveyor position) is performed.

In the process of pretreatment drying D, the workpiece 1 is passed through an electrodeposition-drying furnace while maintaining the floor conveyor position without changing the workpiece position (12).

In finish coating E, the workpiece 1 is conveyed into a finish-coating booth of a spray type. At the moveable portion provided on the conveyor 2, if the workpiece 1 is moved while horizontally rotating 90° each time around a shaft of the conveyor 2, each process of bottom painting in the overhead conveyor position (13), side painting in the side conveyor position (14), opposite side painting in the side conveyor position (15) and top painting in the floor conveyor position (16) is performed in sequence, wherein each surface not to be painted is always kept face upward for the best results.

Next, a fourth embodiment, in which a pair of upper and lower travelling rail is provided in a similar painting line will be described below with reference to the accompanying drawings.

Figure 20:
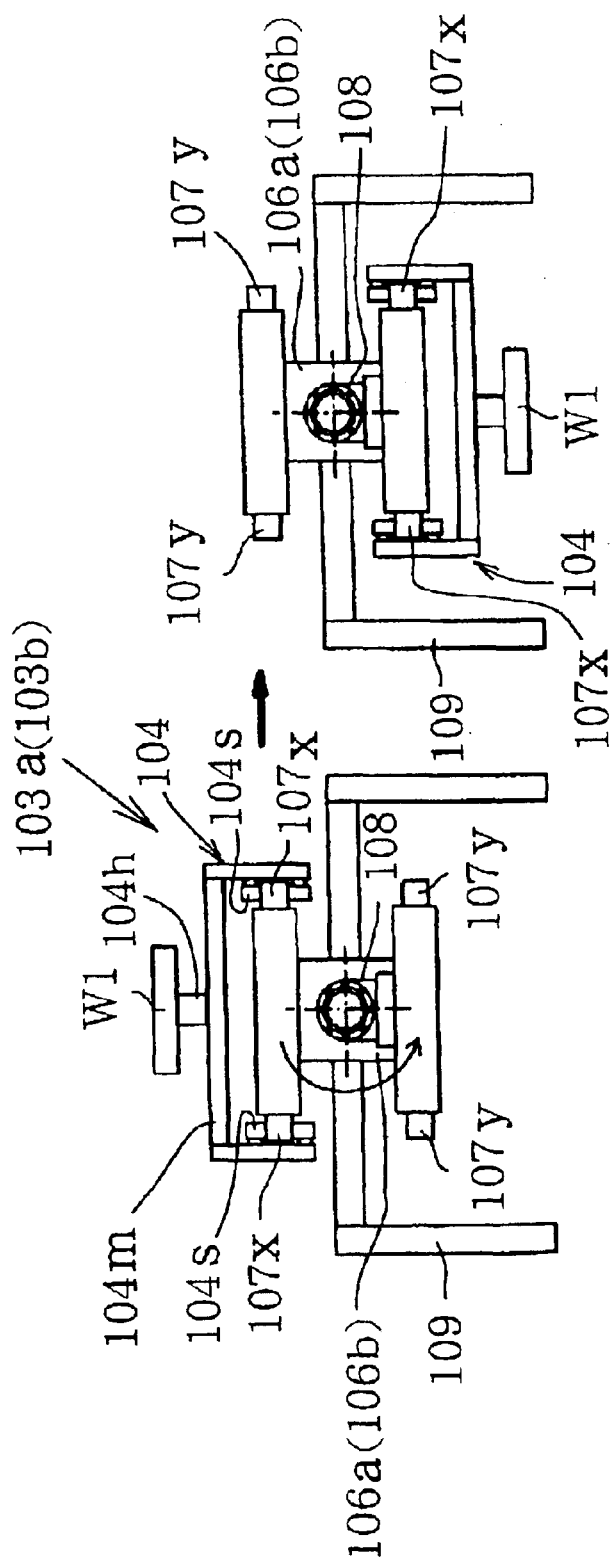
FIG. 20 is a view explaining a n inverted condition of a carrier inversion mechanism viewed from the front.
Figure 21:
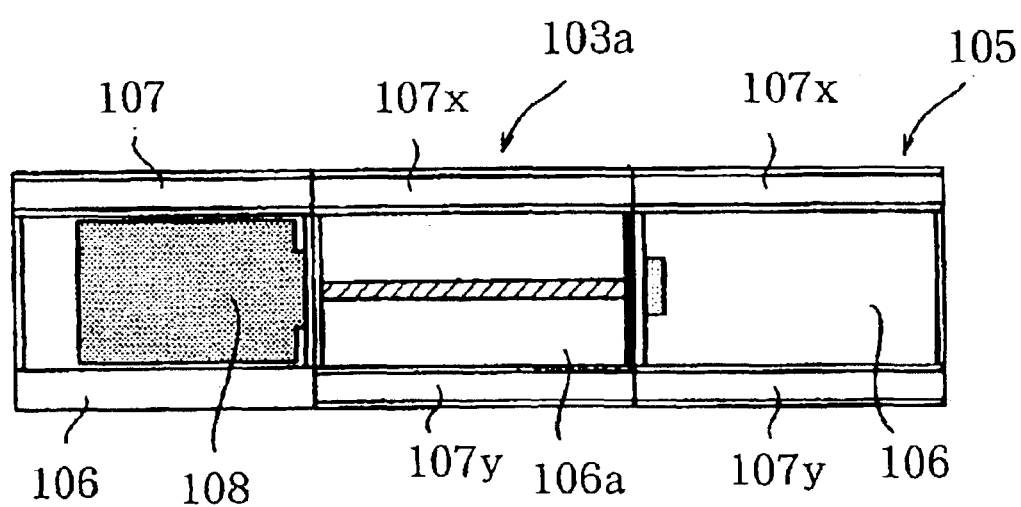
FIG. 21 is a view explaining a drive source of the carrier inversion mechanism.
Figure 23:
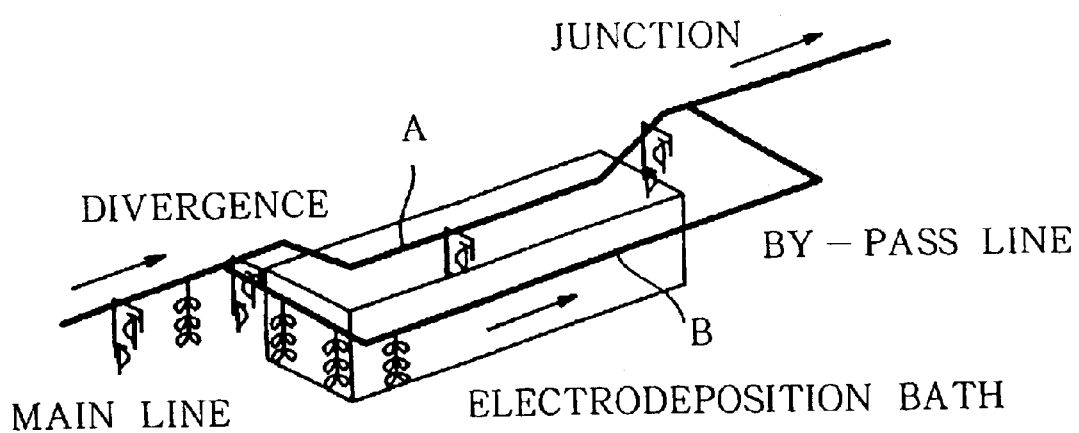
FIG. 23 is a view explaining a conveyance apparatus of the prior art.

FIG. 19 is a side view for explaining the structure of the present conveyance apparatus. FIG. 20 is a front view of FIG. 19 and FIG. 21 is an explanatory view of a driving source of a carrier inversion mechanism. FIGS. 22(a) and 22(b) are views explaining the relationship between the carrier and the conveying stand in the case of a single rail.

The conveyance apparatus according to the present invention is, for example, applied to a conveyance apparatus which is intended to handle a workpiece requiring electrodeposition painting and a workpiece not requiring the electrodeposition painting on a common line, in a manufacturing process for a fuel tank, a frame body or the like, as parts for a motorcycle. This intends to simplify the apparatus, to reduce the equipment costs, and also can eliminate the necessity for complicated conveying control.

As shown in FIGS. 19(a) and 19(b) a workpiece conveying path 102 is provided above an electrodeposition bath 101 as a treatment bath. Along this workpiece conveying path 102, both a workpiece W1 which undergoes electrode position painting and a work piece W2 which does not undergo electrodeposition painting are arranged to be convertible by means of a carrier 104.

For this purpose, carrier inversion mechanisms 103a, 103b are provided in the workpiece conveying path 102 above the electrodeposition bath 101 to position an intermediate travelling portion 105 of the intermediate portion of the path between the upstream and downstream sides of the electrodeposition bath. The position of the workpiece W1 which undergoes electrodeposition painting is inverted 180°, as shown in FIG. 19(b), by means of the inversion mechanism on the upstream side to pass the intermediate travelling portion 105. After being switched to a course by which the workpiece W1 travels through the electrodeposition bath 101, the workpiece W1 is inverted to its original position by means of the carrier inversion mechanism 103b on the downstream side. The workpiece W2 which does not undergo electrodeposition painting is caused to pass the carrier inversion mechanism 103a, 103b area without changing the position, as shown in FIG. 19(a), and to have a course passing above the electrodeposition bath 101.

The workpiece conveying path 102 is provided with travelling rails 107 mounted on both sides of a rail support 106. Rail supports 106, 106a, 106b of the workpiece conveying path 102 above the electrodeposition bath 101 are provided with at least a pair of upper and lower travelling rails 107x, 107y. The carrier inversion mechanism 103a, 103b is arranged so that respective rail supports 106a, 106b can be inverted.

As shown in FIG. 21, an inversion motor 108 is fixedly secured to the rail support 106 of the fixed side adjacent to the carrier inversion mechanisms 103a, 103b. A drive shaft of this inversion motor 108 is secured to the center of the rail supports 106a, 106b of each carrier inversion mechanism 103a, 103b. Each of rail supports 106a, 106b is adapted to be rotatable 180° by the inversion motor 108 in a plane crossing at right angles to the conveying path.

In addition, the pair of travelling rails 107x, 107y of the rail supports 106a, 106b which can freely invert are symmetrically positioned above and below relative to the center of the drive shaft of the inversion motor 108. For example, before inverting, when the travelling rail 107x above the carrier inversion mechanism 103a, 103b coincides with the line of the travelling rail 107x above the intermediate travelling portion 105, the travelling rail 107x of the carrier inversion mechanism 103a, 103b after inverting, is adapted to coincide with a line of the travelling rail 107 below the intermediate travelling portion 105.

The carrier 104, as shown in FIG. 20, is provided with a sliding portion 104s which slidably engages the left and right travelling rails 107, a gate-shaped portion 104m which projects outwardly in a shape to straddle the rail support 106, and a workpiece holding portion 104h which is projectingly provided at the center of the gate-shaped portion 104m. The workpieces W1, W2 can be retained by this workpiece holding portion 104h.

A conveying stand 109 of the rail support 106 at at least the intermediate travelling portion 105 of the workpiece conveying path 102, as shown in FIG. 20, is provided standing upright on a floor surface and is intended to support the intermediate portions of the upper and lower travelling rails 107x, 107y. The carrier 104 and the conveying stand 109 are designed not to interfere with one another, whether the workpiece is supported by the upper carrier 104 or the lower carrier 104.

Specifically, in order that the carrier 104 and the conveying stand 109 do not interfere with one another, in the case where the carrier 104 and the workpiece W1 are inverted by means of the carrier inversion mechanism 103a, and in the case where the carrier 104 and the workpiece W2 pass in the non-inverted state, the workpiece conveying path 102 at at least the upper portion of the electrodeposition bath 101 is formed with double, upper and lower, travelling rails 107x, 107y. If only one rail is used, as shown in FIG. 22, in a position (FIG. 22(a)) of the conveying stand 109, where the carrier 104 is placed above the drive shaft of the inversion motor 108, if the carrier 104 is inverted downwardly together with the rail support 106, the carrier 104 and the conveying stand 109 will interfere with one another. In addition, a position (FIG. 22(b)) of the conveying stand 109, where the carrier 104 is placed below the drive shaft of the inversion motor 108, if the carrier 104 is inverted upwardly together with the rail support 106, the carrier 104 and a supporting portion 109a of the conveying stand 109 will interfere with one another.

Therefore, there is some possibility that in the case of one rail, conveyance can not be performed depending on the positions of the carrier 104 and the workpiece. The double, upper and lower, rail structure is therefore employed in the present invention so that conveyance can be performed irrespective of these positions.

An operation of the above-mentioned conveyance apparatus will be described.

As shown in FIGS. 19(a) and 19(b) when the workpiece retained by the carrier 104 is transferred from the left side of FIGS. 19(a) and 19(b) along the travelling rail 107 up to the carrier inversion mechanism 1039(a) on the upstream side, if this is the workpiece to be immersed in the electrodeposition bath 101 for painting, as shown in FIG. 19(b), the diversion motor 108 of the carrier inversion mechanism 103a is actuated to invert the rail support 106a 180°.

As a result, the position of the carrier 104 and the workpiece W1 is also inverted 180°, and the workpiece is immersed in the electrodeposition bath 101, then, the upper travelling rail 107x on which the carrier 104 has traveled up to that time contacts the lower travelling rail 107y of the intermediate travelling portion 105.

When the carrier 104 travels the lower travelling rail 107y of the intermediate travelling portion 105 and reaches the carrier inversion mechanism 103b at the downstream side, this drive motor 108 is actuated to invert the workpiece together with the rail support 6a, whereby the workpiece is pulled from the electrodeposition bath 101 to return to its original position, then conveyed downstream.

Next, in case of the workpiece W2 which does not undergo the electrodeposition painting, as shown in FIG. 19(a), when the workpiece W2 retained by the carrier 104 is transferred from the left side of the figure along the travelling rail 107 up to the carrier inversion mechanism 103a on the upstream side, the original position is maintained and the carrier 104 travels along the upper travelling rail 107x of the intermediate travelling portion 105 and is transferred via the carrier inversion mechanism 103b as is.

That is, the workpiece W2 passes without being immersed in the electrodeposition bath 101.

As outlined above, it is possible to transfer both the workpiece W1 which is immersed in the electrodeposition bath 101 and the workpiece W2 which is not immersed in the electrodeposition bath 101, and it is unnecessary to implement complicated transferring control as in a by-pass line of the prior art. It is also possible to avoid extending the conveying path.

A fifth embodiment of the present invention will be now described with reference to the accompanying drawings.

Figure 25:
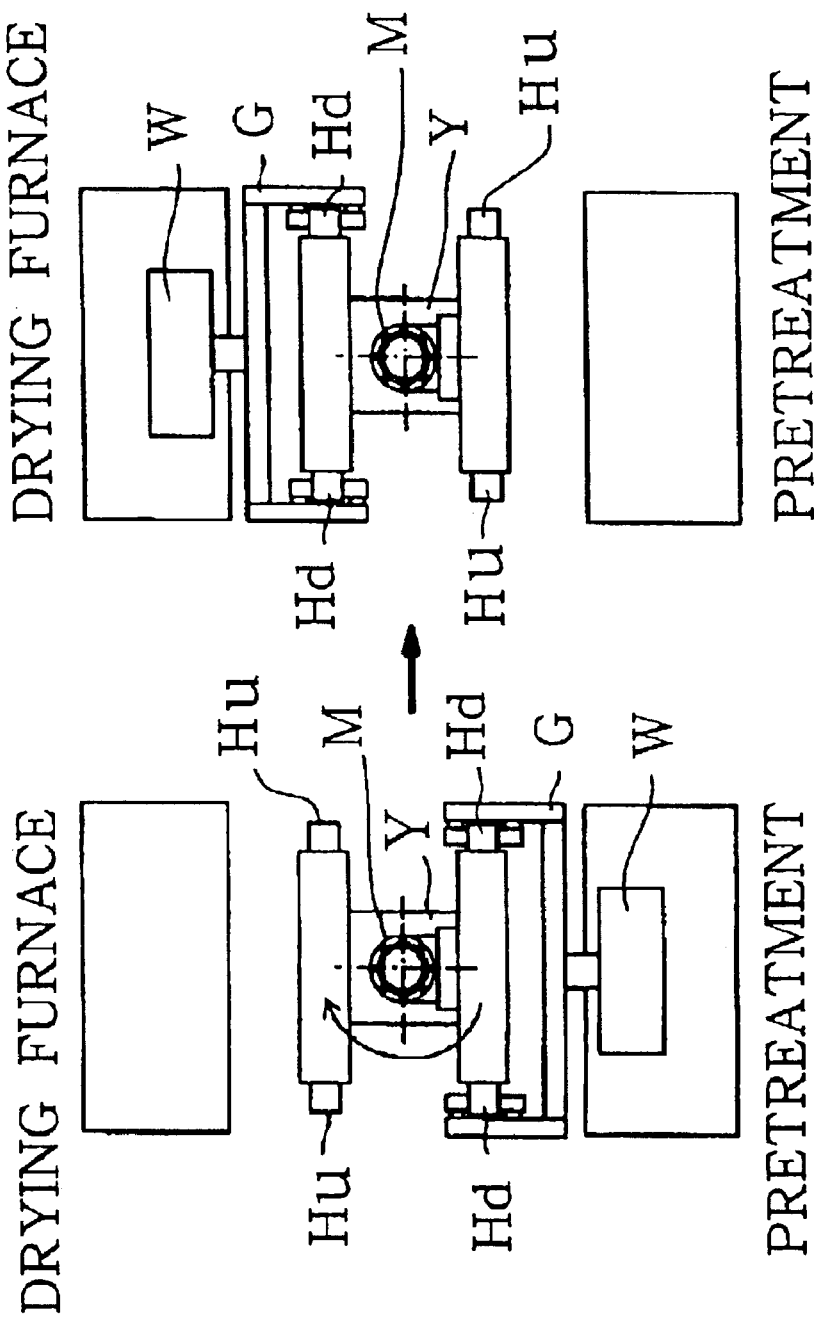
FIG. 25 is an explanatory view of a conveyance apparatus using a conveying path inverting mechanism viewed from its front direction.
Figure 26:
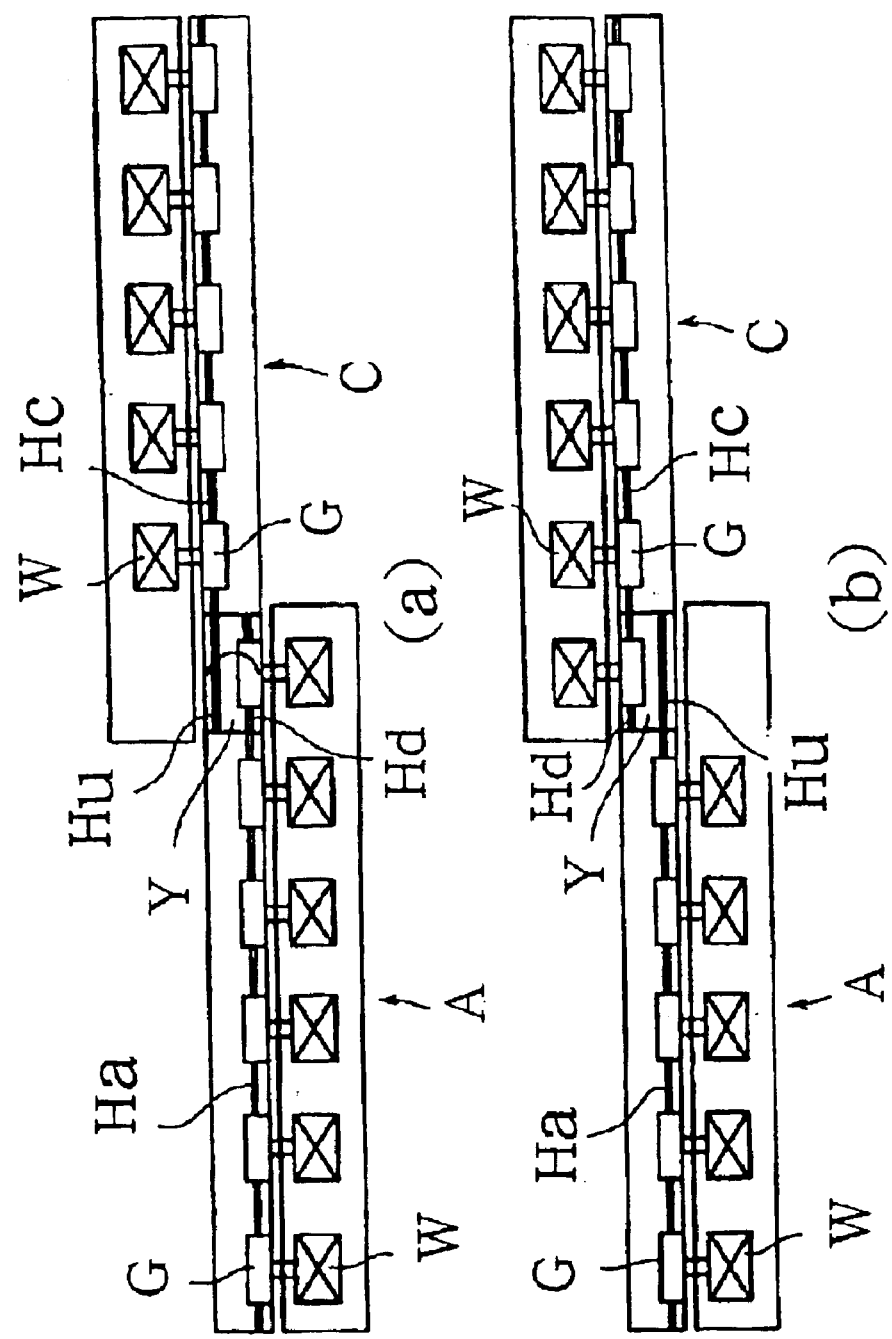
FIGS. 26(a) and 26(b) are explanatory views of a conveyance apparatus using a conveying path inverting mechanism viewed from its side direction.
Figure 27:
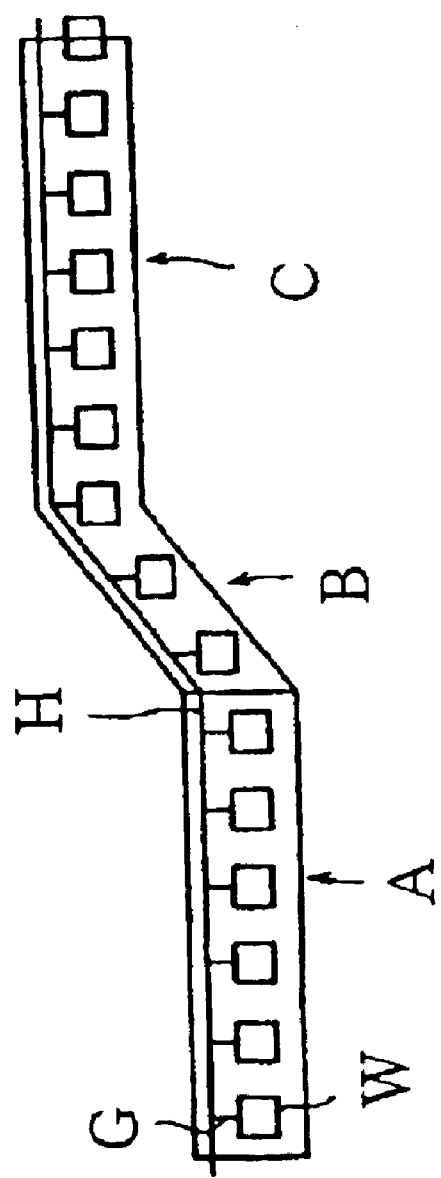
FIG. 27 is a conveyance apparatus of the prior art.

FIGS. 24(a) and 24(b) are explanatory views of a conveyance apparatus using a conveyance path lifter mechanism. FIG. 25 and FIGS. 26(a) and 26(b) are explanatory views of a conveyance apparatus using a conveyance path reversing mechanism.

According to the conveyance apparatus of the present invention, in an assembly line for vehicles, pretreatment such as electrodeposition is applied to vehicle body parts and the conveyance apparatus is constructed to feed these parts to the drying process, wherein the space for installing the equipment is minimized and investment for the equipment can also be reduced.

The workpiece conveyance path in the form of travelling rails or the like is provided between the pretreatment process such as an electrodeposition painting and the drying process. A series of operation from painting to drying can be continuously carried out by allowing the workpiece to move along the workpiece conveyance path. The workpiece conveyance path for the drying process is installed at a higher level than the workpiece conveyance path for the pretreatment process to prevent hot air of, for example, about 140° C.~160° C. in the drying process from entering the pretreatment process in which a normal temperature of about 25° C. is to be maintained. Thus, the hot air which tends to remain at the high level is controlled not to affect the workpiece conveyance path for the pretreatment process.

In addition, according to the present invention, in a drying equipment in which the height of a workpiece conveyance path for a pretreatment process and the height for a workpiece conveyance path for a drying process differ, a connecting workpiece conveyance path is provided with a conveyance path lifter mechanism or a conveyance path reversing mechanism so that the distance between the pretreatment process and the drying process can be shortened and the space for equipment. can be minimized. A construction example with the conveyance path lifter mechanism will be described with reference to FIG. 24.

Figure 24:
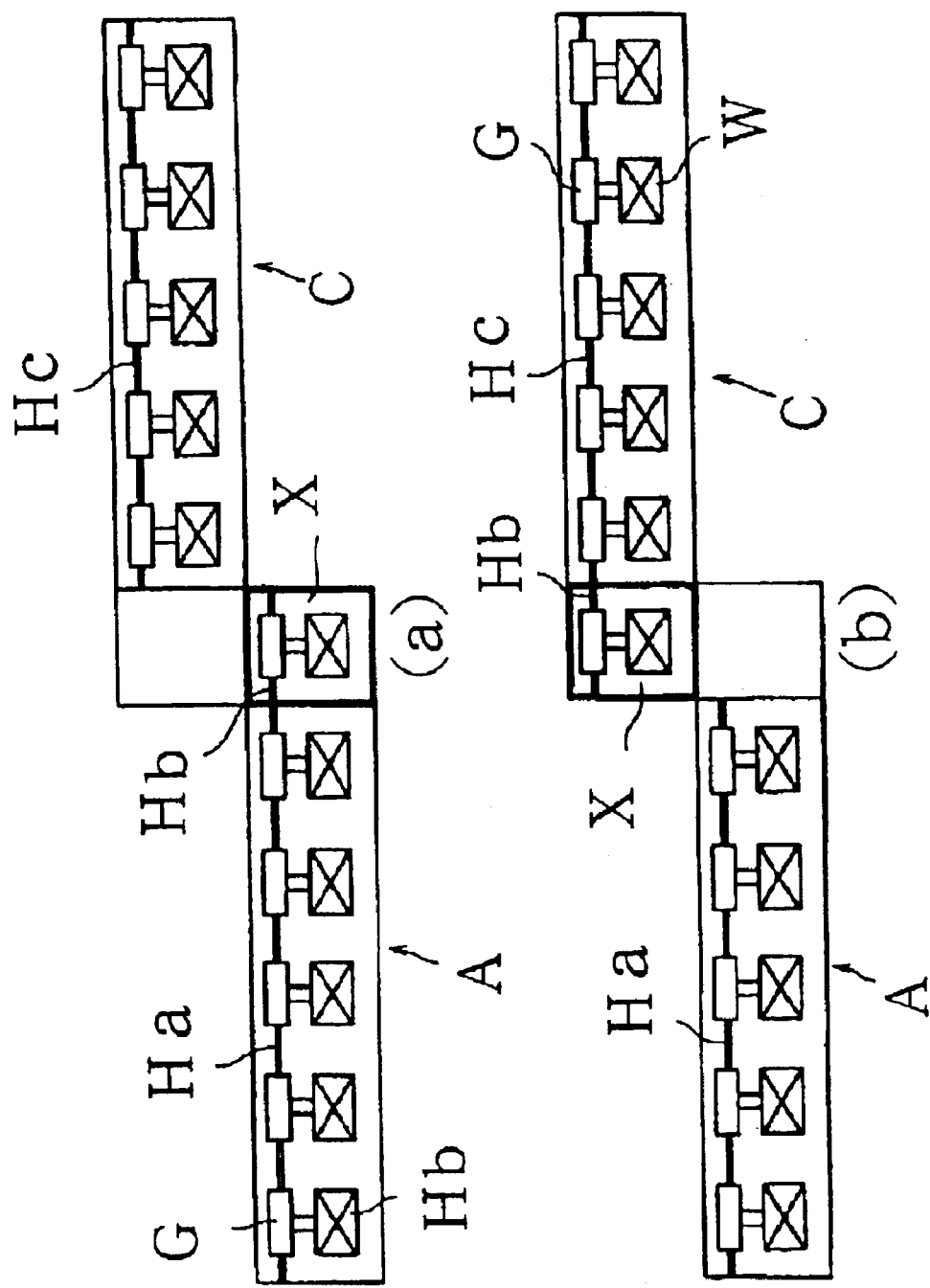
FIGS. 24(a) and 24(b) are explanatory view of a conveyance apparatus using a conveying path lifter mechanism.

As shown in FIG. 24, in a pretreatment process A in which, for example, an electrodeposition bath or the like is arranged, a workpiece conveyance path Ha is provided, which allows a workpiece W transported by a carrier G to be immersed in an electrodeposition bath (not shown). The workpiece W is supported by the carrier G.

A workpiece conveyance path Hc for a drying process C is arranged and provided at a higher level than the workpiece conveyance path Ha for the pretreatment process to prevent hot air, which tends to remain at the higher level, from entering the pretreatment process A. A connecting workpiece conveyance path Hb which is situated between the drying process C and the pretreatment process A is provided on a rail supporting elevator X. This rail supporting elevator X is arranged to move up and down by the conveyance path lifter mechanism.

This conveyance path lifter mechanism is provided with, for example, an elevator cylinder or the like (not shown) for moving up and down the rail supporting elevator X. At the downward position, the connecting workpiece conveyance path Hb and the workpiece conveyance path Ha of the pretreatment process A become interconnected, while at the upward position, the connecting workpiece conveyance path Hb and the workpiece conveyance path Hc of the drying process C become interconnected.

In the conveyance apparatus described above, as shown in FIG. 24(a), when the workpiece W which has been painted in the pretreatment process is transferred to the connecting workpiece conveyance path Hb by the carrier G, the rail supporting elevator X is caused to ascend together with the carrier G by means of the conveyance path lifter mechanism, and, as shown in FIG. 24(b), the connecting workpiece conveyance path Hb is connected to the workpiece conveyance path Hc of the drying process C.

In addition, the carrier G proceeds to the drying process C and the workpiece W undergoes drying in a drying furnace or the like, wherein the distance between the pretreatment process A and the drying process C can be minimized. Thus, it is possible to reduce equipment costs and save space.

Next, an example of a structure in the case where a connecting workpiece conveyance path can be freely reversed by means of a conveyance path reversing mechanism is described with reference to FIG. 25 and FIGS. 26(a) and 26(b).

In this example, a conveyance path reversing mechanism is provided at an intermediate portion of a pretreatment process A and a drying process C. This conveyance path reversing mechanism, for example, as shown in FIG. 25, is so designed that a rail supporting and reversing body Y is freely rotated about a central axis parallel to the conveying direction by means of a reversing motor M or the like. On this rail supporting and reversing body Y are provided pairs of upper and lower workpiece conveyance paths Hu, Hd, at the left and right sides, respectively.

In addition, when this rail supporting and reversing body Y is reversed 180° in a plane at right angles to the conveying direction, the lower workpiece conveyance path Hd connected to the workpiece conveyance path Ha for the pretreatment process A side becomes connected to the workpiece conveyance path Hc for the drying process C side. Also, the upper workpiece conveyance path Hu connected to the workpiece conveyance path Hc for the drying process C side becomes connected to the workpiece conveyance path Ha of the pretreatment process A side.

In the conveyance apparatus as described above, as shown in FIG. 26(a), when the workpiece W which has been painted in the pretreatment process A is transferred to the workpiece conveyance path Hd below the rail supporting and reversing body Y through the workpiece conveyance path Ha, the rail supporting and reversing body Y is reversed by 180° together with the carrier G by the conveyance path reversing mechanism, and, as shown in FIG. 26(b), the workpiece conveyance path Hd with which the carrier G engages is connected to the workpiece conveyance path Hc for the drying process C.

In this manner, the positions of the carrier G and the workpiece W are reversed by 180°.

In addition, the carrier G is transferred to the drying process C and the workpiece W is dried therein. In this case, also, because the distance between the pretreatment process A and the drying process C can be minimized, it is possible to reduce the equipment costs and save the space.

The invention is not limited to the embodiments as mentioned above. Those having substantially the same structure as described in the appended claims of the present invention and performing the same operation and effect are considered to fall within the technical scope of the present invention.

For example, it is to be noted that the workpiece position control according to the present invention is not limited to a car body painting line, but can be applied, for example, to other surface treatment lines. Further, as far as the continuous workpiece position control such as for an assembly line of a car body is required, the present invention can also be applied to various treatments.

Also, the treatment bath may be a dipping bath other than the electrodeposition bath, and the kind of workpiece may be optionally selected.

It is to be noted that the carrier inversion mechanism 103a, 103b may not necessarily be provided at two locations. It may be provided at only one location, whereby after the workpiece is inverted and immersed in the treatment bath, it may again be inverted to return to its original position and further transferred.

Also, concrete structures or the like for driving means of the conveyance path lifter mechanism and for the conveyance path reversing mechanism may be optionally selected.

What is claimed is:

1. A conveyance apparatus for mixed workpieces in which a workpiece conveying path is provided above a treatment bath, and a workpiece to be immersed in the treatment bath and a workpiece not to be immersed in the treatment bath are adapted to be mixedly conveyed by means of a carrier which is capable of running along a travelling rail of said workpiece conveying path, wherein a carrier inversion mechanism is provided in at least one portion of said workpiece conveying path above said treatment bath, and said workpiece to be immersed in said treatment bath is inverted in a plane at right angles to said conveying path by said carrier inversion mechanism, to allow the workpiece to pass the treatment bath.

2. The conveyance apparatus for mixed workpieces according to claim 1, wherein said carrier inversion mechanism can be inverted together with said travelling rail of said workpiece conveying path.

3. The conveyance apparatus for mixed workpieces according to claim 1, wherein said carrier inversion mechanism is paired to position an intermediate travelling portion between the upstream side and the downstream side of said workpiece conveying path above said treatment bath.

4. The conveyance apparatus for mixed workpieces according to claim 1, wherein said travelling rail is formed as a double, upper and lower rail, structure.

5. The conveyance apparatus for mixed workpieces according to claim 2, wherein said carrier inversion mechanism is paired to position an intermediate travelling portion between the upstream side and the downstream side of said workpiece conveying path above said treatment bath.

6. The conveyance apparatus for mixed workpieces according to claim 2, wherein said travelling rail is formed as a double, upper and lower rail, structure.

7. The conveyance apparatus for mixed workpieces according to claim 3, wherein said travelling rail is formed as a double, upper and lower rail, structure.

8. A conveyance apparatus in which a workpiece is conveyed along a workpiece conveyance path from a pretreatment process to a drying process, comprising:

a carrier with a support arm for supporting the workpiece;

a workpiece conveyance path for a pretreatment process, a workpiece conveyance path for a drying process; and a connecting workpiece conveyance path being provided at an intermediate portion of the two processes, wherein, on the connecting workpiece conveyance path, a conveyance path lifter mechanism is provided to transfer the workpiece, the carrier, and the support arm which are conveyed from the workpiece conveying path of the pretreatment process toward the workpiece conveyance path of the drying process.

9. The conveyance apparatus according to claim 8, wherein the conveyance path lifter mechanism is a rail supporting elevator.

10. The conveyance apparatus according to claim 8, wherein the workpiece is conveyed from the conveyance path for the pretreatment process into the connecting workpiece conveyance path in a horizontal direction along a substantially straight line, is lifted by the conveyance path lifter mechanism along a substantially straight line in a direction substantially at right angles to a direction of the conveyance path of the pretreatment process, and then is conveyed in substantially a straight line from the connecting workpiece conveyance path into the conveyance path of the drying process in a direction substantially at right angles to a direction of the connecting workpiece conveyance direction.

11. The conveyance apparatus according to claim 10, wherein the support arm rotates the workpiece.

12. A conveyance apparatus, comprising:

a workpiece conveyance path for a pretreatment process provided at a first height;

a workpiece conveyance path for a drying process provided at a second height;

a connecting workpiece conveyance path being provided at an intermediate portion of the two processes, wherein, on the connecting workpiece conveyance path, a conveyance path reversing mechanism is provided to transfer a workpiece conveyed from the workpiece conveyance path of the pretreatment process toward the workpiece conveyance path of the drying process by rotating the workpiece by an amount substantially equal to 180° in a plane at right angles to a direction of the conveyance path.

13. The conveyance apparatus according to claim 12, further comprising a carrier with a support arm for supporting the workpiece.

* * * * *

UNITED STATES PATENT AND TRADEMARK OFFICE
CERTIFICATE OF CORRECTION

PATENT NO.    : 6,745,888 B2
DATED         : June 8, 2004
INVENTOR(S)   : Shunichi Furusawa, Hidenobe Nishida and Makoto Sakai It is certified that error appears in the above-identified patent and that said Letters Patent is hereby corrected as shown below:

<u>Title page,</u>
Item [75], Inventors, please delete the following two (2) inventors form the listing of inventors:

"Chitoshi Sagane, Kumamoto (JP)" and "Yuji Masaki, Kumamoto (JP)."

Signed and Sealed this

Seventh Day of December, 2004

JON W. DUDAS
*Director of the United States Patent and Trademark Office*